United States Patent
Okamoto

(10) Patent No.: US 8,937,742 B2
(45) Date of Patent: Jan. 20, 2015

(54) FACSIMILE MACHINE AND COMMUNICATION SYSTEM

(71) Applicant: KYOCERA Document Solutions Inc., Osaka (JP)

(72) Inventor: Kentaro Okamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/261,110

(22) Filed: Apr. 24, 2014

(65) Prior Publication Data

US 2014/0320931 A1    Oct. 30, 2014

(30) Foreign Application Priority Data

| Apr. 26, 2013 | (JP) | 2013-094792 |
| Apr. 27, 2013 | (JP) | 2013-094793 |
| Apr. 27, 2013 | (JP) | 2013-094794 |
| Apr. 27, 2013 | (JP) | 2013-094795 |

(51) Int. Cl.
*G06F 3/12* (2006.01)
*H04N 1/40* (2006.01)

(52) U.S. Cl.
CPC ................ *H04N 1/40093* (2013.01)
USPC ........................ 358/1.15; 358/452

(58) Field of Classification Search
None
See application file for complete search history.

(56) References Cited

U.S. PATENT DOCUMENTS

| 6,449,062 B1 | 9/2002 | Endo |
| 2006/0126101 A1* | 6/2006 | Shutt et al. ............. 358/1.15 |

FOREIGN PATENT DOCUMENTS

| JP | H11-275338 | 10/1999 |
| JP | 2003-167705 | 6/2003 |
| JP | 2007-166201 | 6/2007 |

* cited by examiner

*Primary Examiner* — Barbara Reinier
(74) *Attorney, Agent, or Firm* — Knobbe Martens Olson & Bear LLP

(57) ABSTRACT

A multifunctional peripheral includes an image reading unit, an image memory, a facsimile communication unit, a modification instruction reception unit, and a data modification unit. The image reading unit acquires data to be transmitted by facsimile. The image memory stores the acquired data. The facsimile communication unit performs facsimile transmission of the data in the image memory to a counterpart. The modification instruction reception unit accepts a modification instruction to modify the data of already transmitted and untransmitted pages, while the facsimile transmission to the counterpart is being performed. The data modification unit modifies the data of the page designated as object of the modification while the facsimile transmission is being performed.

16 Claims, 23 Drawing Sheets

Fig.14

------------ REPORT ------------

· DELETE THIRD PAGE OF TRANSMITTED PAGES

THIRD PAGE

○ × △

----------

----------

----------

----------

TO DELETE

Fig.15
------------ REPORT ------------
- EXCHANGE FIFTH AND SIXTH PAGES OF TRANSMITTED PAGES
FIFTH PAGE              SIXTH PAGE
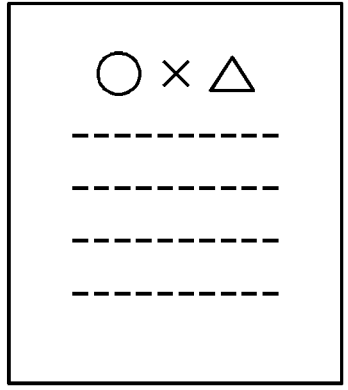    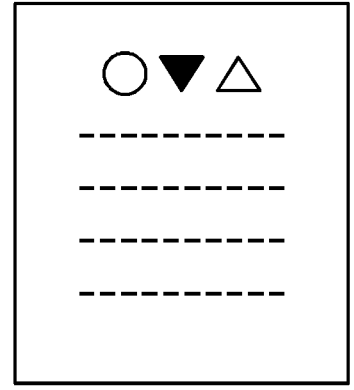

Fig.16
------------ REPORT ------------
- SUBSTITUTE FIFTH PAGE OF TRANSMITTED PAGES WITH NEW FIFTH PAGE
FIFTH PAGE        NEW FIFTH PAGE
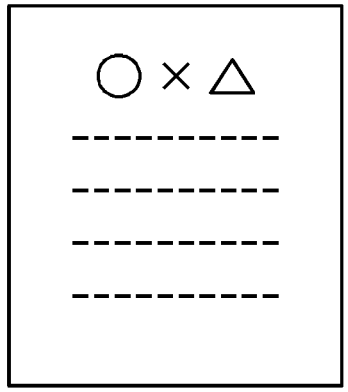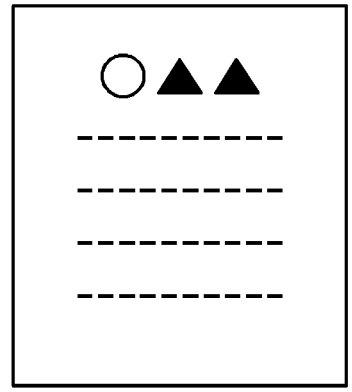

Fig.17
------------ REPORT ------------
- INSERT NEW SIXTH PAGE BEHIND THE
  FIFTH PAGE OF TRANSMITTED PAGES
FIFTH PAGE              NEW SIXTH PAGE
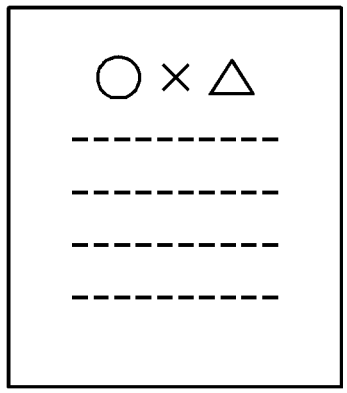   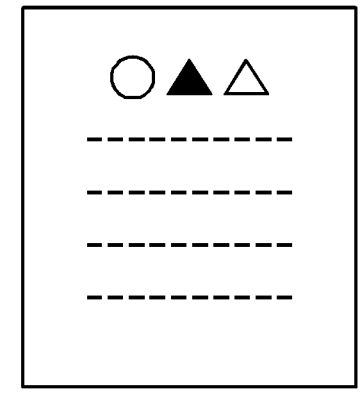

---------- REPORT ------------

• DELETE THIRD PAGE OF TRANSMITTED PAGES

THIRD PAGE

TO DELETE

TOTAL NUMBER OF PAGES IN HEADER IMAGE OF FIRST TO FIFTH PAGES OF TRANSMITTED PAGE HAS TO BE CORRECTED

TOTAL NUMBER OF PAGES IS
NOW 9 INSTEAD OF 10

ERROR: (○/10)
CORRECT: (○/9)

Fig.20
----------- REPORT ------------
• INSERT NEW SIXTH PAGE BEHIND THE FIFTH PAGE OF TRANSMITTED PAGES
FIFTH PAGE     NEW SIXTH PAGE
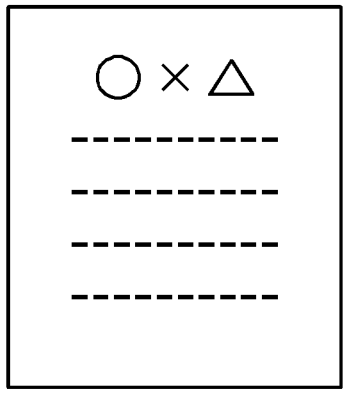
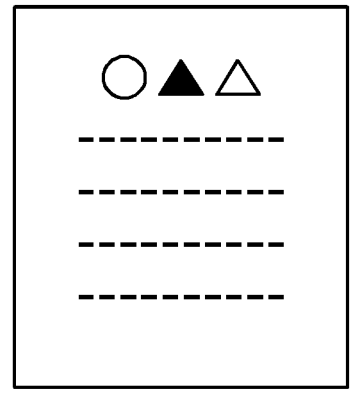
TOTAL NUMBER OF PAGES IN HEADER IMAGE OF FIRST TO FIFTH PAGES OF TRANSMITTED PAGE HAS TO BE CORRECTED
TOTAL NUMBER OF PAGES IS NOW 11 INSTEAD OF 10
ERROR: (○/10)
CORRECT: (○/11)

Fig.21

------------ REPORT ------------

TOTAL NUMBER OF PAGES IN HEADER IMAGE OF FIRST TO FIFTH PAGES OF TRANSMITTED PAGE HAS TO BE CORRECTED

TOTAL NUMBER OF PAGES IS
NOW 9 INSTEAD OF 10

ERROR: (◯/10)
CORRECT: (◯/9)

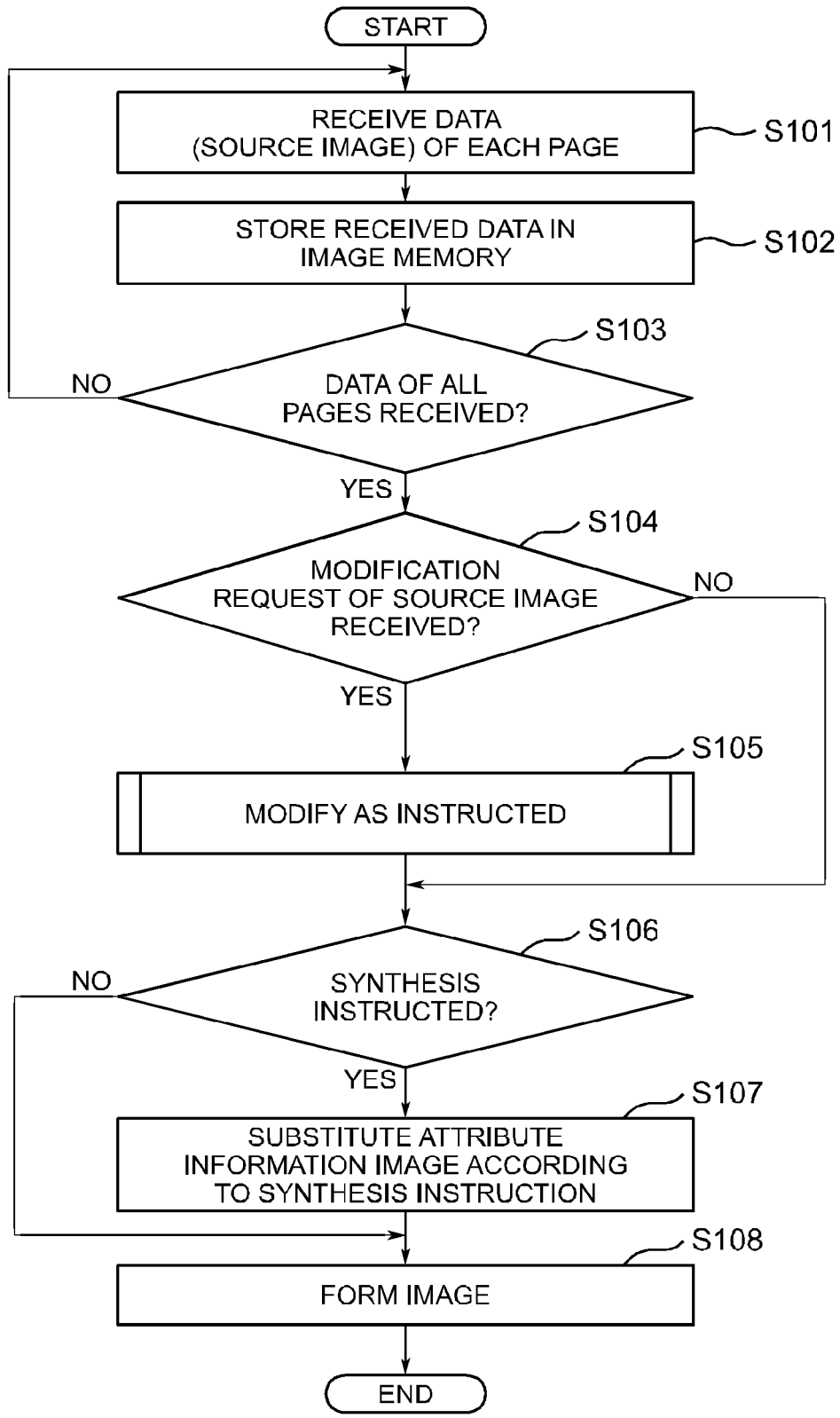

FACSIMILE MACHINE AND COMMUNICATION SYSTEM

INCORPORATION BY REFERENCE

This application relates to and claims priority from Japanese Patent Application No. 2013-094792, filed in the Japan Patent Office on Apr. 26, 2013, and from Japanese Patent Application Nos. 2013-094793, 2013-094794, 2013-094795, each filed in the Japan Patent Office on Apr. 27, 2013, the entire disclosure of which are incorporated herein by reference.

BACKGROUND

The present disclosure relates to a facsimile machine, and more particularly to a technique of modifying data which is the object of facsimile transmission.

Some facsimile machines are configured to display a source image acquired by reading a source document, which is the object of facsimile transmission, on a display screen when the facsimile is to be transmitted, accept an instruction of a user to correct or delete the image data, and perform the facsimile transmission of the source image after correcting or deleting the image data. It is also possible to display the source image on the display screen for confirmation while transmitting the source image, and to subsequently transmit, with respect to a source image that includes an error, the corrected source image so that a user of the counterpart facsimile machine can substitute the printed hard copy with the corrected one. Further, a new page can be added to already transmitted pages, or one of the already transmitted pages can be modified, by transmitting to the counterpart a request for addition, insertion, or substitution of the image already transmitted by facsimile and information designating a mail box.

SUMMARY

In an aspect, the disclosure provides a facsimile machine including a data acquisition unit, a storage unit, a facsimile communication unit, a modification instruction reception unit, and a data modification unit.

The data acquisition unit acquires data to be transmitted by facsimile together with page information of the data, with respect to each of one or more pages.

The storage unit temporarily stores therein the data acquired by the data acquisition unit.

The facsimile communication unit reads out the data temporarily stored in the storage unit with respect to each page, and performs facsimile transmission of the data of each page to a designated counterpart facsimile machine, in the order of the pages.

The modification instruction reception unit accepts, while the facsimile communication unit is performing the facsimile transmission to the counterpart, a modification instruction to modify the data of already transmitted and untransmitted pages, with respect to each page.

The data modification unit modifies the data of one or more pages designated as object of modification according to the modification instruction accepted by the modification instruction reception unit, while the facsimile communication unit is performing the facsimile transmission of the acquired data to the counterpart.

With the facsimile machine configured as above, the data modification unit modifies the data of one or more pages designated as object of modification according to the modification instruction, while the facsimile communication unit is performing the facsimile transmission of the acquired data to the counterpart. Therefore, the facsimile transmission job can be finished with the desired modification of the data to be transmitted incorporated in the transmitted data.

In another aspect, the disclosure provides a communication system including a transmitting-end facsimile machine and a receiving-end facsimile machine.

The transmitting-end facsimile machine includes the data acquisition unit, the storage unit, the facsimile communication unit, the modification instruction reception unit, and the data modification unit.

The receiving-end facsimile machine includes a data reception unit, a received data storage unit, a modification unit, and an image forming unit.

The data reception unit receives a source image together with page information from another facsimile machine, with respect to each of one or more pages.

The received data storage unit temporarily stores therein the source image of each page received by the data reception unit.

The modification unit modifies, when the data reception unit receives from the another facsimile machine a modification request to modify the source image of each page stored in the received data storage unit while receiving the source image from the another facsimile machine, the source image of each page stored in the received data storage unit in accordance with the modification request.

The image forming unit forms an image from the modified source image of each page stored in the received data storage unit.

With the communication system configured as above, the modification unit modifies the source image of each page in accordance with the modification request, when the data reception unit receives from the another facsimile machine a modification request to modify the source image of each page stored in the received data storage unit, and the image forming unit prints the modified source image of each page. The mentioned configuration allows the receiving-end facsimile machine to print out the modified source image before finishing the facsimile communication, even when the source image is modified to a different image by the transmitting-end facsimile machine during the facsimile communication.

In still another aspect, the disclosure provides a communication system including a transmitting-end facsimile machine and a receiving-end facsimile machine.

The transmitting-end facsimile machine includes a data acquisition unit, an image generation unit, a storage unit, a facsimile communication unit, a modification instruction reception unit, a data modification unit, and a modification decision unit.

The data acquisition unit acquires data to be transmitted by facsimile together with page information of the data, with respect to each of one or more pages.

The image generation unit generates an attribute information image representing attribute information of a header or a footer corresponding to each page and synthesizes the attribute information image with the data of each page acquired by the data acquisition unit.

The storage unit temporarily stores therein the data of each page synthesized with the attribute information image by the image generation unit.

The facsimile communication unit reads out the data temporarily stored in the storage unit with respect to each page, and performs facsimile transmission of the data of each page to a designated counterpart facsimile machine, in the order of the pages.

The modification instruction reception unit accepts, while the facsimile communication unit is performing the facsimile transmission to the counterpart, a modification instruction to modify the data of already transmitted and untransmitted pages, with respect to each page.

The data modification unit modifies the data of one or more pages designated as object of modification according to the modification instruction accepted by the modification instruction reception unit, while the facsimile communication unit is performing the facsimile transmission of the acquired data to the counterpart.

The modification decision unit decides whether the attribute information of the data of each page is to be modified because of the modification made by the data modification unit.

Here, the image generation unit newly generates, when the modification decision unit decides that the attribute information is to be modified, an attribute information image for the modified data of each page and synthesizes the newly generated attribute information image with the data of the corresponding page among the data of the pages stored in the storage unit, and the facsimile communication unit transmits the attribute information image newly generated for the data of the already transmitted page to the counterpart facsimile machine, together with a synthesis instruction to synthesize the new attribute information image with the data of the corresponding page.

The receiving-end facsimile machine includes a data reception unit, a received data storage unit, a modification unit, and an image forming unit.

The data reception unit receives a source image together with page information from another facsimile machine, with respect to each of one or more pages.

The received data storage unit temporarily stores therein the source image of each page received by the data reception unit.

The modification unit modifies, when the data reception unit receives from the another facsimile machine a modification request to modify the source image of each page stored in the received data storage unit while receiving the source image from the another facsimile machine, the source image of each page stored in the received data storage unit in accordance with the modification request.

The image forming unit forms an image from the modified source image of each page stored in the received data storage unit.

Here, when the data reception unit receives, from the another facsimile machine as the modification request, the new attribute information image representing the attribute information of the header or the footer of the source image of each page stored in the received data storage unit, and a substitution instruction to substitute the original attribute information image of the source image of each page with the new attribute information image, the modification unit substitutes the original attribute information image of the source image of the page designated by the substitution instruction among the source images of the pages stored in the received data storage unit, with the new attribute information image.

With the communication system configured as above, the modification unit modifies the source image of each page and the attribute information of the data in accordance with the modification request, when the data reception unit receives from the another facsimile machine a modification request to modify the source image of each page stored in the received data storage unit and the attribute information of the data, and the image forming unit prints the modified source image of each page and the modified attribute information. The mentioned configuration allows the receiving-end facsimile machine to print out the modified source image and the attribute information of the data before finishing the facsimile communication, even when the source image is modified to a different image by the transmitting-end facsimile machine during the facsimile communication.

BRIEF DESCRIPTION OF THE DRAWINGS

FIG. 14 is a drawing showing a result of image formation based on a report image received;

FIG. 15 is a drawing showing another result of image formation based on a report image received;

FIG. 16 is a drawing showing still another result of image formation based on a report image received;

FIG. 17 is a drawing showing still another image formed on the basis of a report image received;

FIG. 20 is a drawing showing another result of image formation based on a report image received;

FIG. 21 is a drawing showing still another result of image formation based on a report image received;

FIG. 23 is a flowchart showing a facsimile reception procedure performed by a receiving-end multifunctional peripheral.

DETAILED DESCRIPTION

Hereafter, a facsimile machine and a facsimile communication program according to the embodiments of the disclosure will be described with reference to the drawings.

Figure 1:
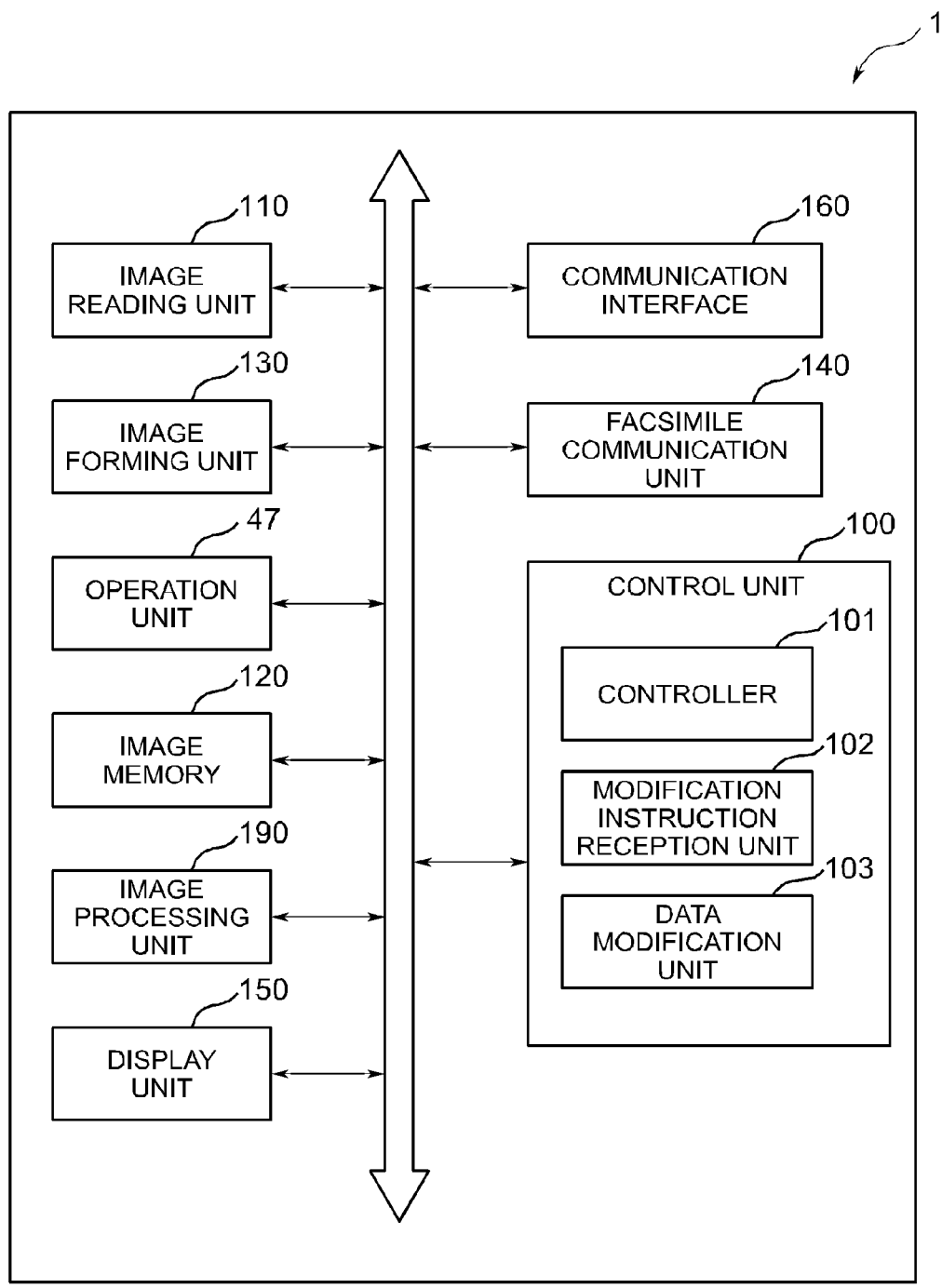
FIG. 1 is a block diagram showing an internal configuration of a multifunctional peripheral incorporated with a facsimile machine, according to a first embodiment of the disclosure.

FIG. 1 is a block diagram showing an internal configuration of a multifunctional peripheral incorporated with a facsimile machine, according to a first embodiment of the disclosure.

The multifunctional peripheral 1 according to the first embodiment includes a control unit 100, an image reading unit 110, an image memory 120, an image forming unit 130, and a facsimile communication unit 140.

The image reading unit 110 includes a scanner that reads a source document and acquires a source image.

The image reading unit 110 may also include a document loading region including a document table and an automatic document feeder (ADF) having a discharge mechanism that discharges the source document that has been read, and the scanner that reads the image of the source document delivered from the document loading region.

The image reading unit 110 exemplifies the data acquisition unit in the disclosure, and reads the source documents to be transmitted by facsimile one by one to thereby acquire the data of the source documents (source image) together with page information with respect to each page, as data to be transmitted by facsimile.

Here, data of each page of source documents acquired by a personal computer or the like, connected to the multifunctional peripheral 1 via a network through a communication interface 160 to be subsequently described, is also included in the data to be transmitted by facsimile. Accordingly, the communication interface 160 is also an example of the data acquisition unit.

The image memory 120 is a region where data to be printed by the image forming unit 130 is temporarily stored, such as the data of the source document read by the image reading unit 110, and the data to be transmitted by facsimile acquired by the facsimile communication unit 140 or the communication interface 160.

The image memory 120 corresponds to the storage unit in the disclosure that temporarily stores therein the data of each page of the source documents acquired by the image reading unit 110.

The image forming unit 130 reads out the data stored in the image memory 120, for example the data of the source document read by the image reading unit 110, and the data received by the facsimile communication unit 140 from another facsimile machine through a public circuit.

The facsimile communication unit 140 performs various functions necessary for performing the facsimile communication, to transmit and receive image data to and from external facsimile machines through the public circuit.

For example, a controller 101 reads out, in the order of the pages, the data of each page of the source document read by the image reading unit 110 for facsimile transmission and temporarily stored in the image memory 120, and causes the facsimile communication unit 140 to transmit the mentioned data by facsimile to a counterpart facsimile machine designated by the user through an operation unit 47 to be subsequently described.

The control unit 100 includes a CPU, a ROM, a RAM, and so forth, and serves to control the overall operation of the multifunctional peripheral 1. The control unit 100 includes the controller 101, a modification instruction reception unit 102, and a data modification unit 103. A facsimile communication program to be performed by the multifunctional peripheral 1 is stored in a non-illustrated HDD or the ROM, and the control unit 100 works in accordance with the facsimile communication program thus serves as the modification instruction reception unit 102 and the data modification unit 103. However, the modification instruction reception unit 102 and the data modification unit 103 may be set up as a hardware circuit, instead of being realized as functions performed according to the facsimile communication program.

This also applies to other embodiments, unless otherwise specifically noted.

The controller 101 controls the overall operation of the multifunctional peripheral 1.

The modification instruction reception unit 102 accepts an instruction to modify the data of already transmitted and untransmitted pages from the user with respect to each page, while the facsimile communication unit 140 is performing the facsimile transmission to a facsimile machine that is the counterpart of the facsimile communication.

For example, the modification instruction reception unit 102 accepts, through manipulation of the operation unit 47 by the user, an instruction to delete the data, substitute the data with another one, exchange the order of the pages, or insert a new page, with respect to each page of the data temporarily stored in the image memory 120 (data of each page of the source documents ready by the image reading unit 110), or the data of each page of the source documents already transmitted to the counterpart facsimile machine.

The data modification unit 103 modifies the data of the page to be modified according to the modification instruction accepted by the modification instruction reception unit 102, while the facsimile communication unit 140 is performing the facsimile transmission job to transmit the data to be transmitted by facsimile, acquired by the image reading unit 110 or the communication interface 160 and stored in the image memory 120.

The data modification unit 103 performs the deletion, the substitution, the exchange, or the insertion, for example according to the modification instruction inputted by the user.

In the case where the data of the page designated as object of the modification by the modification instruction corresponds to an untransmitted page stored in the image memory 120 without being transmitted by the facsimile communication unit 140, the data modification unit 103 modifies the data of the designated page in accordance with the modification instruction, among the data of the pages stored in the image memory 120.

In contrast, in the case where the data of the page to be modified according to the modification instruction corresponds to a page already transmitted by the facsimile communication unit 140 to the counterpart facsimile machine, the data modification unit 103 generates a modification request for requesting the counterpart facsimile machine to modify the data of the designated page in accordance with the modification instruction.

The modification request is transmitted to the counterpart facsimile machine of the facsimile transmission job being performed, in addition to the data of each page to be transmitted by facsimile read out from the image memory 120, before the facsimile transmission job being performed by the facsimile communication unit 140 is finished, i.e., while the facsimile transmission job is being performed.

The multifunctional peripheral 1 also includes the operation unit 47 and a display unit 150.

The operation unit 47 includes an image formation key of transmission start key, a ten-key, an abbreviated number key, and so forth, and is used by the user for inputting various job instructions, for example the facsimile transmission job, and the deletion, the substitution, the exchange, or the insertion of the data of each page of the source document to be transmitted by facsimile.

In other words, the operation unit 47 accepts from the user, as a part of the modification instruction reception unit, the instruction to modify the data of already transmitted and untransmitted pages with respect to each page, while the facsimile transmission job inputted by the user is being performed.

The display unit 150 includes a liquid crystal display (LCD) or the like, to display operation guidances for the user.

The display unit 150 may be given a touch panel function, so as to serve as a part of the operation unit 47 for receiving the instructions from the user.

The multifunctional peripheral 1 further includes an image processing unit 190 that edits and processes the image read by the image reading unit 110, and the communication interface 160 for performing data communication with an external personal computer or a server connected to the multifunctional peripheral 1 via a network.

Hereunder, description will be given on a facsimile communication procedure to be performed between the multifunctional peripheral 1 according to the first embodiment and a facsimile machine which is the counterpart of the facsimile communication.

Figure 2:
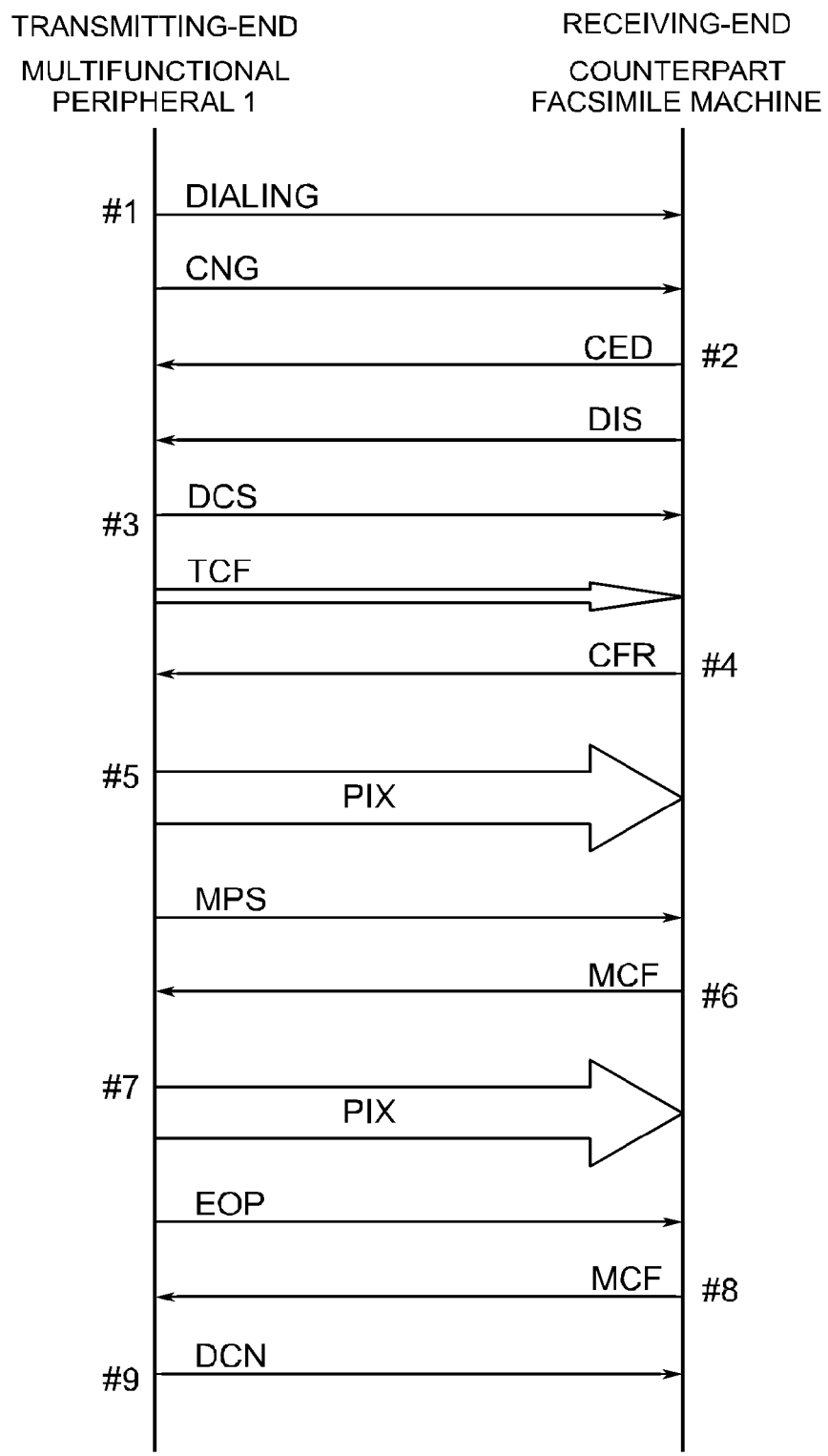
FIG. 2 is a timing chart showing a facsimile communication procedure between the multifunctional peripheral according to the first embodiment and another facsimile machine acting as a counterpart of facsimile communication.

FIG. 2 is a timing chart showing the facsimile communication procedure between the multifunctional peripheral 1 according to the first embodiment and the counterpart facsimile machine in the facsimile communication.

The facsimile communication unit 140 in the multifunctional peripheral 1 acting as a transmitting-end machine (simply referred to as multifunctional peripheral 1 in the description of the facsimile communication procedure) originates a call by dialing according to a facsimile transmission instruction (facsimile transmission job) inputted by the user through the operation unit 47, and transmits a CNG signal to the counterpart facsimile machine to notify that the multifunctional peripheral 1 is a facsimile machine about to perform facsimile communication (#1).

The facsimile communication unit in the counterpart facsimile machine acting as a receiving-end machine (simply referred to as counterpart facsimile machine in the description of the facsimile communication procedure) returns, upon receipt of the CNG signal, a CED signal which is the response signal to the CNG signal, and a DIS signal indicating the function of the receiving-end machine (for example, CCITT standard) to the multifunctional peripheral 1 (#2).

Upon receipt of the CED signal and the DIS signal from the counterpart facsimile machine, the multifunctional peripheral 1 transmits a DCS signal indicating the setup data of the multifunctional peripheral 1 (for example, CCITT standard) and a TCF signal for modem training, to the counterpart facsimile machine (#3).

The counterpart facsimile machine returns, upon receipt of the DCS signal and the TCF signal a CFR signal indicating successful reception to the multifunctional peripheral 1 (#4).

Upon receipt of the CFR signal, the multifunctional peripheral 1 acting as the transmitting-end machine transmits the data of the first page (PIX) to be transmitted in the facsimile transmission job being performed, to the counterpart facsimile machine (#5).

In the case where one or more additional pages are to be transmitted in the current facsimile transmission job, the multifunctional peripheral 1 further transmits an MPS signal indicating that additional data is to be transmitted, to the counterpart facsimile machine.

The counterpart facsimile machine acting as the receiving-end machine temporarily stores the data of the first page (PIX) in the image memory.

The counterpart facsimile machine then returns an MCF signal indicating that the data of the first page has been properly received, to the multifunctional peripheral 1 (#6).

Upon receipt of the MCF signal from the counterpart facsimile machine, the multifunctional peripheral 1 transmits the data of the next page (PIX) and the MPS signal to the counterpart facsimile machine, provided that the multifunctional peripheral 1 is holding the data of the next page to be transmitted by facsimile.

In this case, the counterpart facsimile machine repeats the step of #6, in which the received data (PIX) is temporarily stored in the image memory and the MCF signal is returned to the multifunctional peripheral 1.

Thereafter, the steps of #5 and #6 are repeated until the multifunctional peripheral 1 completes the transmission of the data of all the pages to be transmitted, to the counterpart facsimile machine.

Upon transmitting to the counterpart facsimile machine the data of the final page (PIX) to be transmitted by facsimile, the multifunctional peripheral 1 transmits an EOP signal indicating that the data transmission has ended, to the counterpart facsimile machine (#7).

The counterpart facsimile machine returns the MCF signal indicating that the data of the final page has been received, to the multifunctional peripheral 1 (#8).

The multifunctional peripheral 1 transmits a DCN signal to the counterpart facsimile machine and disconnects the line, upon receipt of the MCF signal from the counterpart facsimile machine after transmitting the EOP signal.

A facsimile transmission procedure performed by the multifunctional peripheral 1 according to the first embodiment will now be described hereunder.

Figure 3:
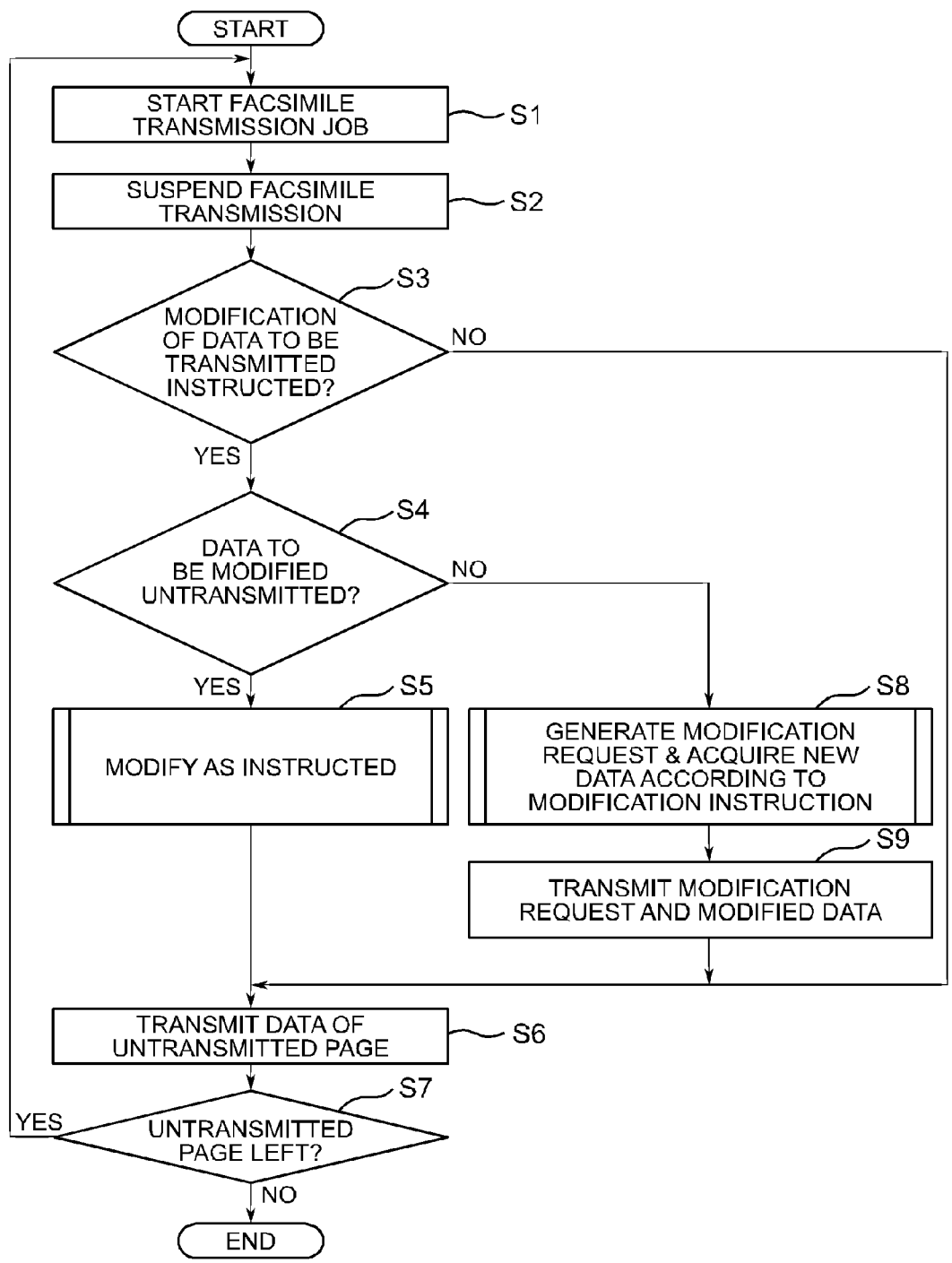
FIG. 3 is a flowchart showing a facsimile transmission procedure performed by the multifunctional peripheral according to the first embodiment.

FIG. 3 is a flowchart showing the facsimile transmission procedure performed by the multifunctional peripheral 1 according to the first embodiment.

Figure 4:
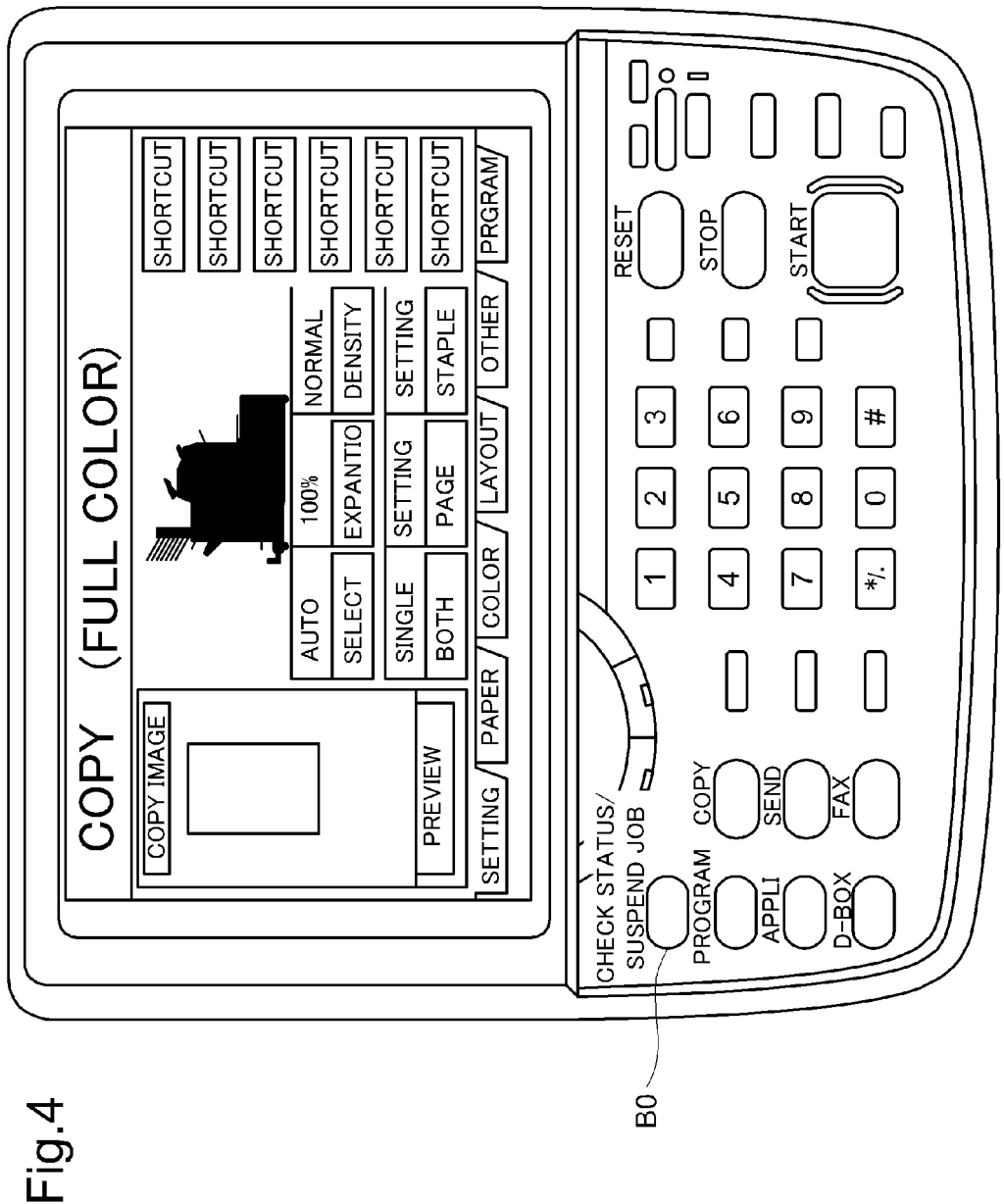
FIG. 4 is a drawing showing an operation unit and a display unit.

FIG. 4 illustrates the operation unit 47 and the display unit 150.

Figure 5:
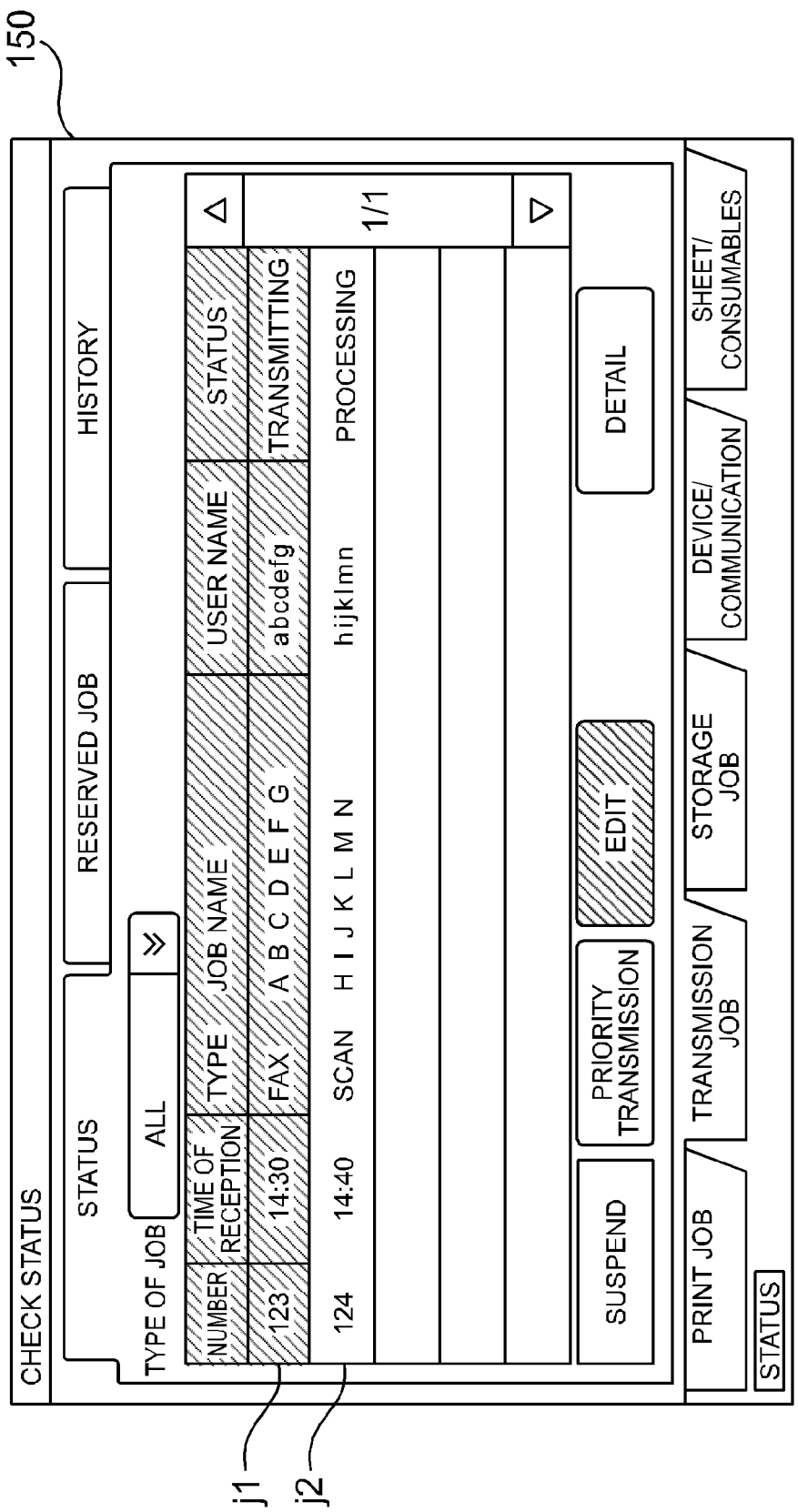
FIG. 5 is a drawing showing an example of display on the display unit.
Figure 6:
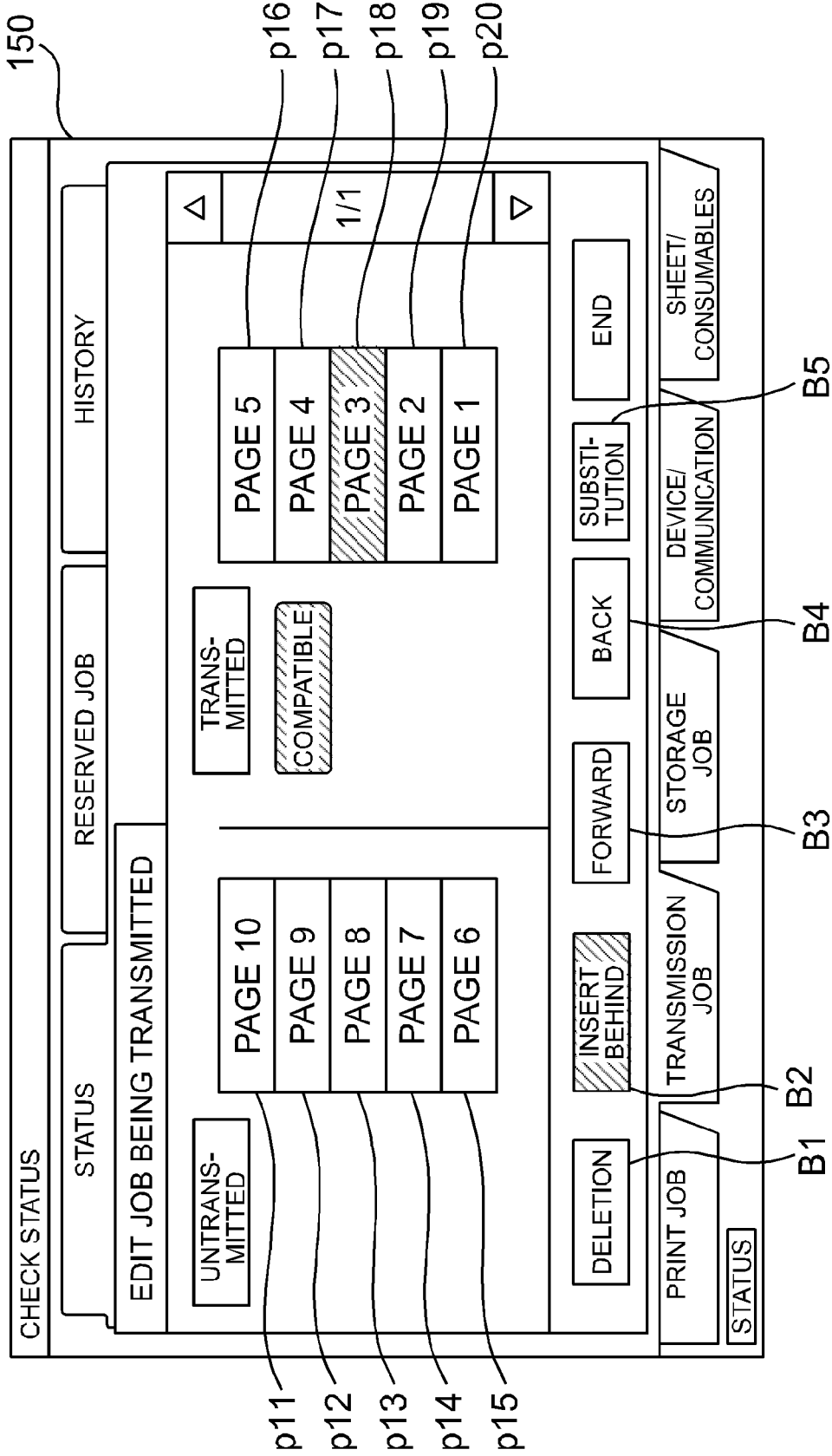
FIG. 6 is a drawing showing another example of display on the display unit.

FIGS. 5 and 6 illustrate examples of the display on the display unit 150.

Figure 7:
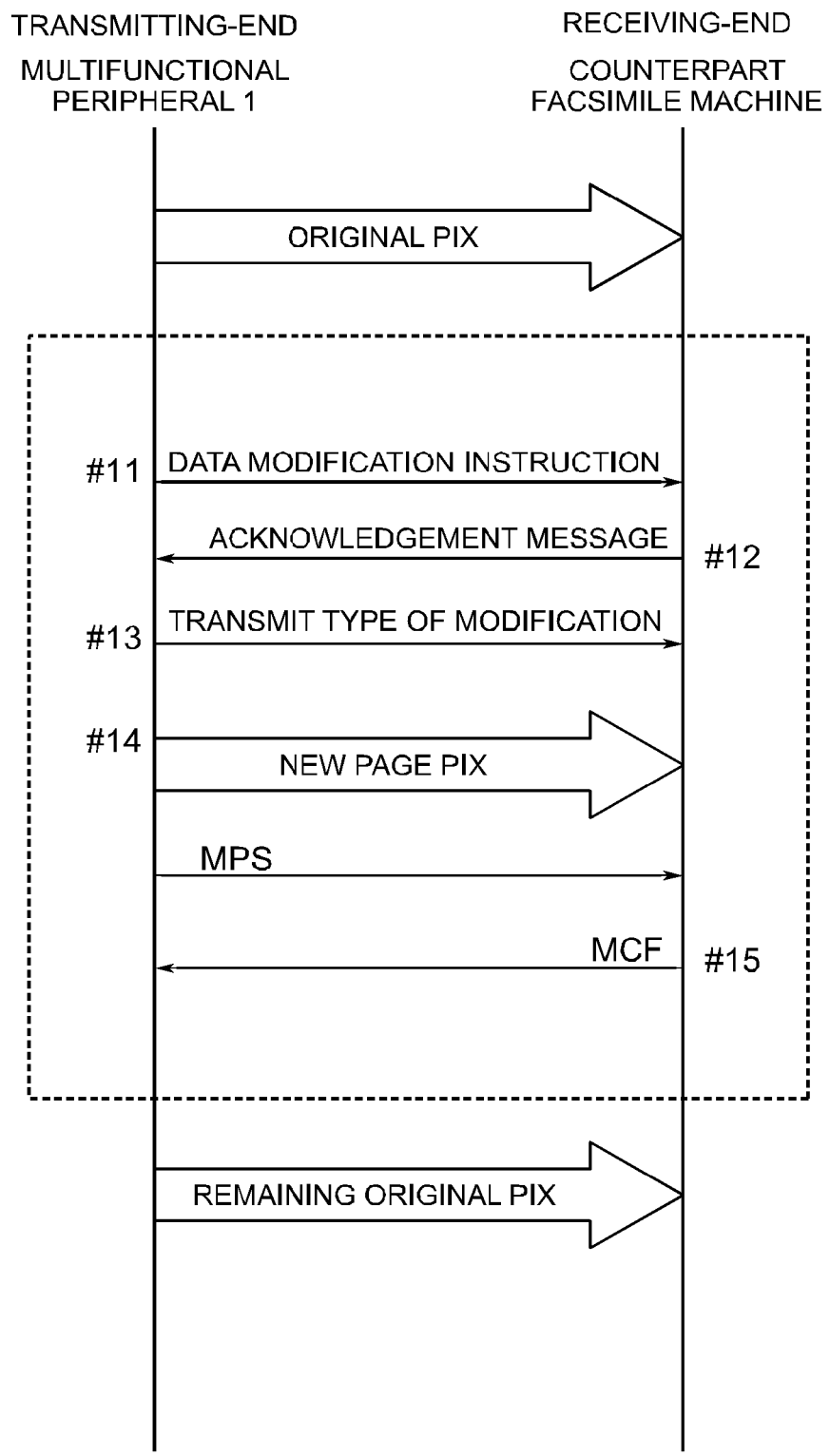
FIG. 7 is a timing chart showing a facsimile communication procedure performed in a modification process between the multifunctional peripheral according to the first embodiment and another facsimile machine acting as a counterpart of facsimile communication.

FIG. 7 is a timing chart showing a facsimile communication procedure performed in a modification process between the multifunctional peripheral according to the first embodiment and another facsimile machine acting as a counterpart of facsimile communication.

For example, when the user sets the source document to be transmitted by facsimile on the document table of the image reading unit 110 and inputs a facsimile transmission instruction through the operation unit 47 of the multifunctional peripheral 1, the controller 101 accepts a facsimile transmission job.

The controller 101 starts to execute the facsimile transmission job (S1).

In other words, the steps corresponding to #1 to #9 shown in FIG. 2 are started.

At the start of the facsimile transmission job, the controller 101 first activates the image reading unit 110 to read the source document set on the document table.

At this point, the controller 101 is ready to accept an additional facsimile transmission job instructed by the user through the operation unit 47.

For example, while the source document corresponding to the facsimile transmission job inputted first is being read, the facsimile transmission job subsequently inputted is set to a stand-by state.

In contrast, in the case where the reading of the source document of the preceding job is finished and the facsimile transmission job has been started, the reading of the source document of the next job is performed at the same time.

During the execution of the preceding facsimile transmission job, for example when the user presses a "Check status/Suspend job" key B0 of the operation unit 47 shown in FIG. 4, the controller 101 accepts the instruction to display a job list indicating the facsimile transmission jobs being performed and in the stand-by state and suspends the facsimile transmission being performed (S2).

At this point, the controller 101 displays the facsimile transmission jobs that have been accepted, in job display columns j1 and j2 of the display unit 150, as shown in FIG. 5.

For example, when the user presses the touch panel of the operation unit 47, more precisely the touch panel of the display unit 150 serving as a part of the operation unit 47 at the position corresponding to the job display column j1 representing the facsimile transmission job including the data of the pages that the user wishes to modify, the controller 101 accepts the designation of the facsimile transmission job represented by the job display column j1 through the touch panel function.

The controller 101 causes the display unit 150 to display, among the data of the pages to be transmitted by facsimile in the designated facsimile transmission job, the images representing the data of the pages read by the image reading unit 110 and stored in the image memory 120 and the images representing the data of the pages already transmitted to the counterpart facsimile machine.

For example as shown in FIG. 6, the controller 101 classifies the data into page images p11 to p15 representing untransmitted images temporarily stored in the image memory 120 and in the stand-by state for the facsimile transmission by the multifunctional peripheral 1 to the counterpart facsimile machine, and page images p16 to p20 representing the pages already transmitted by the multifunctional peripheral 1 to the counterpart facsimile machine, and causes the display unit 150 to display the page image groups in an "Untransmitted" column and an "Already transmitted" column, respectively.

Then the controller 101 causes the display unit 150 to display a "Deletion" button B1, an "Insert behind" button B2, a "Forward" button B3, a "Back" button B4, and a "Substitution" button B5, which are modification input buttons indicating the types of the modification to be made with respect to each of the pages displayed, together with the page images p11 to p20 representing the untransmitted and already transmitted pages.

The "Deletion" button B1 is used for inputting, using the touch panel function, a deletion instruction with respect to the data of the designated page.

The "Insert behind" button B2 is used for inputting, using the touch panel function, a modification instruction to insert data newly acquired by the image reading unit 110 or the communication interface 160 behind the page pressed by the user among the page images p11 to p20, to thereby add the new data to the data to be transmitted by facsimile.

For example, in the case where the page designated by the user by the press of the button is untransmitted data and the "Insert behind" button B2 is pressed by the user for inputting the modification instruction, the controller 101 causes the image reading unit 110 to read one or more source documents (hereinafter represented by singular form) set on the document loading region, and stores the data that has been read in the image memory 120 as data of the page succeeding the designated page.

As another example, in the case where the page designated by the user by the press of the button has already been transmitted and the "Insert behind" button B2 is pressed by the user for inputting the modification instruction, the controller 101 causes the image reading unit 110 to read the source document set on the document loading region, and causes the facsimile communication unit 140 to transmit the data of the page that has been read to the counterpart facsimile machine, together with the modification request for the insertion generated by the data modification unit 103.

The "Forward" button B3 is used for inputting, using the touch panel function, a modification instruction to exchange the order of the pages by moving the data of the page designated by the user by the press of the button, to ahead of the preceding page.

The "Back" button B4 is used for inputting, using the touch panel function, a modification instruction to exchange the order of the pages by moving the data of the page designated by the user by the press of the button, to behind the previous page.

The "Substitution" button B5 is used for inputting, using the touch panel function, a modification instruction to substitute the data of the page designated by the user by the press of the button with data newly acquired by the image reading unit 110 or the communication interface 160.

For example, in the case where the page designated by the user by the press of the button is untransmitted data and the "Substitution" button B5 is pressed by the user for inputting the substitution instruction, the controller 101 causes the image reading unit 110 to read the source document set on the document loading region, and stores the data that has been read in the image memory 120 as substitution for the data of the designated page.

In the case where the data newly read corresponds to a plurality of pages, the data modification unit 103 carries down the page number of each of the pages succeeding the new pages, according to the increase in number of pages originating from the substitution.

As another example, in the case where the page designated by the user by the press of the button has already been transmitted and the "Substitution" button B5 is pressed by the user for inputting the modification instruction, the controller 101 causes the image reading unit 110 to read the source document set on the document loading region, and causes the facsimile communication unit 140 to transmit the data that has been read to the counterpart facsimile machine, together with the modification request generated as above.

When the controller 101 accepts the modification instruction inputted by the user through the operation unit 47 to designate one of the facsimile transmission jobs and one of the modifications (YES at S3), the data modification unit 103 starts the modification process according to the modification instruction made by the user.

In the case where no modification instruction from the user is accepted by the controller 101 (NO at S3), the operation proceeds to S6 which will be subsequently described.

In the case where the data modification unit 103 decides that the data to be modified according to the modification instruction made by the user is untransmitted data in the facsimile transmission job being performed (YES at S4), the data modification unit 103 executes one of the deletion, the insertion, the exchange, and the substitution, corresponding to the modification instruction inputted through one of the "Deletion" button B1, the "Insert behind" button B2, the "Forward" button B3, the "Back" button B4, and the "Substitution" button B5, respectively (S5).

Thus, in the case where the data to be modified according to the modification instruction is untransmitted data, the data modification unit 103 executes the modification in accordance with the modification instruction, with respect to the data of each page stored in the image memory 120.

Thereafter, the facsimile transmission which has been suspended is resumed, and the facsimile communication unit 140 reads out the data of each of the pages stored in the image memory 120 including the data of the page that has been modified, in the order of the pages, and transmits each of those pages to the counterpart facsimile machine (S6).

In contrast, in the case where the data modification unit 103 decides that the data to be modified according to the modification instruction made by the user has already been transmitted in the facsimile transmission job being performed (NO at S4), the data modification unit 103 generates the modification request to execute one of the deletion, the insertion, the exchange, and the substitution, corresponding to the modification instruction accepted as above through one of the "Deletion" button B1, the "Insert behind" button B2, the "Forward" button B3, the "Back" button B4, and the "Substitution" button B5, respectively, to the counterpart facsimile machine (S8).

Here, in the case where the modification instruction inputted by the user is the insertion or the substitution, the controller 101 causes the image reading unit 110 to read the new source document to be transmitted by facsimile, and stores the corresponding data in the image memory 120 (S8).

The facsimile communication unit 140 transmits the data of the new source document to the counterpart facsimile machine, together with the modification instruction generated as above (S9).

Upon accepting the modification instruction, the controller 101 causes the image reading unit 110 to read the new source document set on the document loading region, in the case where the modification instruction inputted by the user is the insertion or the substitution.

The facsimile communication unit 140 transmits a start signal indicating to the effect that data transmission for performing the modification in accordance with the modification instruction accepted as above is to be started, to the counterpart facsimile machine (#11 in FIG. 7).

The counterpart facsimile machine returns an acknowledgement message to the multifunctional peripheral 1, upon receipt of the start signal (#12).

The multifunctional peripheral 1 transmits a modification signal indicating the type of the modification to be made according to the modification instruction, upon receipt of the acknowledgement message from the counterpart facsimile machine (#13).

Accordingly, the start signal and the modification signal constitute the modification request.

Then the multifunctional peripheral 1 transmits the data required for the modification, for example the data of a new page (PIX), when the data of the new page is used for the modification as in the case where the modification is the insertion or the substitution, to the counterpart facsimile machine (#14).

In the case where the data corresponding to a plurality of pages is to be transmitted as the new data, the multifunctional peripheral 1 transmits the MPS signal indicating that additional pages are yet to be transmitted, to the counterpart facsimile machine.

In this case, the multifunctional peripheral 1 transmits the data of the next page (PIX) and the MPS signal to the counterpart facsimile machine upon receipt of the MCF signal from the counterpart facsimile machine, provided that the multifunctional peripheral 1 is holding the data of the page to be transmitted and the data of succeeding pages.

The counterpart facsimile machine temporarily stores the data of the received pages (PIX) in the image memory, and returns the MCF signal to the multifunctional peripheral 1 (#15).

Thereafter, the steps of #14 and #15 are repeated until the multifunctional peripheral 1 completes the transmission of the data of all the pages to be modified, to the counterpart facsimile machine.

Through such steps, the counterpart facsimile machine inserts or substitutes the data of the new page according to the modification instruction represented by the modification signal received, with respect to the data of each page stored in the image memory.

In the case where the modification does not require new data as in the case of the deletion and the exchange, only the steps #11 to #13 are performed.

In this case, the counterpart facsimile machine deletes the data of the page or exchanges the order of the pages designated as object of the modification according to the modification instruction represented by the modification signal received, among the data of the pages stored in the image memory.

When the facsimile communication unit 140 completes the transmission of the modification request based on the modification instruction and the data required for the modification, the controller 101 resumes the facsimile transmission suspended at S2.

Then the facsimile communication unit 140 reads out each page and continues the facsimile transmission to the counterpart facsimile machine, as long as the data of untransmitted pages is stored in the image memory 120.

During such facsimile transmission, the controller 101 stands by for an input of the modification instruction by the user (YES at S7 to S2), and executes the modification as above upon accepting the modification instruction from the user (YES at S7, S2 to S6, S8, and S9).

When the facsimile communication unit 140 completes the facsimile transmission of the data of all the untransmitted pages stored in the image memory 120 and the image memory 120 no longer holds untransmitted data (NO at S7), the facsimile transmission job is finished.

As described above, in the multifunctional peripheral 1 according to the first embodiment, the data modification unit 103 accepts the modification instruction from the user while the facsimile transmission job is being performed, and modifies the data of the page designated as object of the modification by the modification instruction. Accordingly, the mentioned facsimile transmission job is finished after the modification is performed.

Therefore, even when an error is found in the source image during the facsimile transmission of the same, the multifunctional peripheral 1 according to the first embodiment allows the facsimile transmission job of the source image to be completed with the error corrected through the instruction by the user.

Hereunder, the multifunctional peripheral 1 according to a second embodiment will be described.

Figure 8:
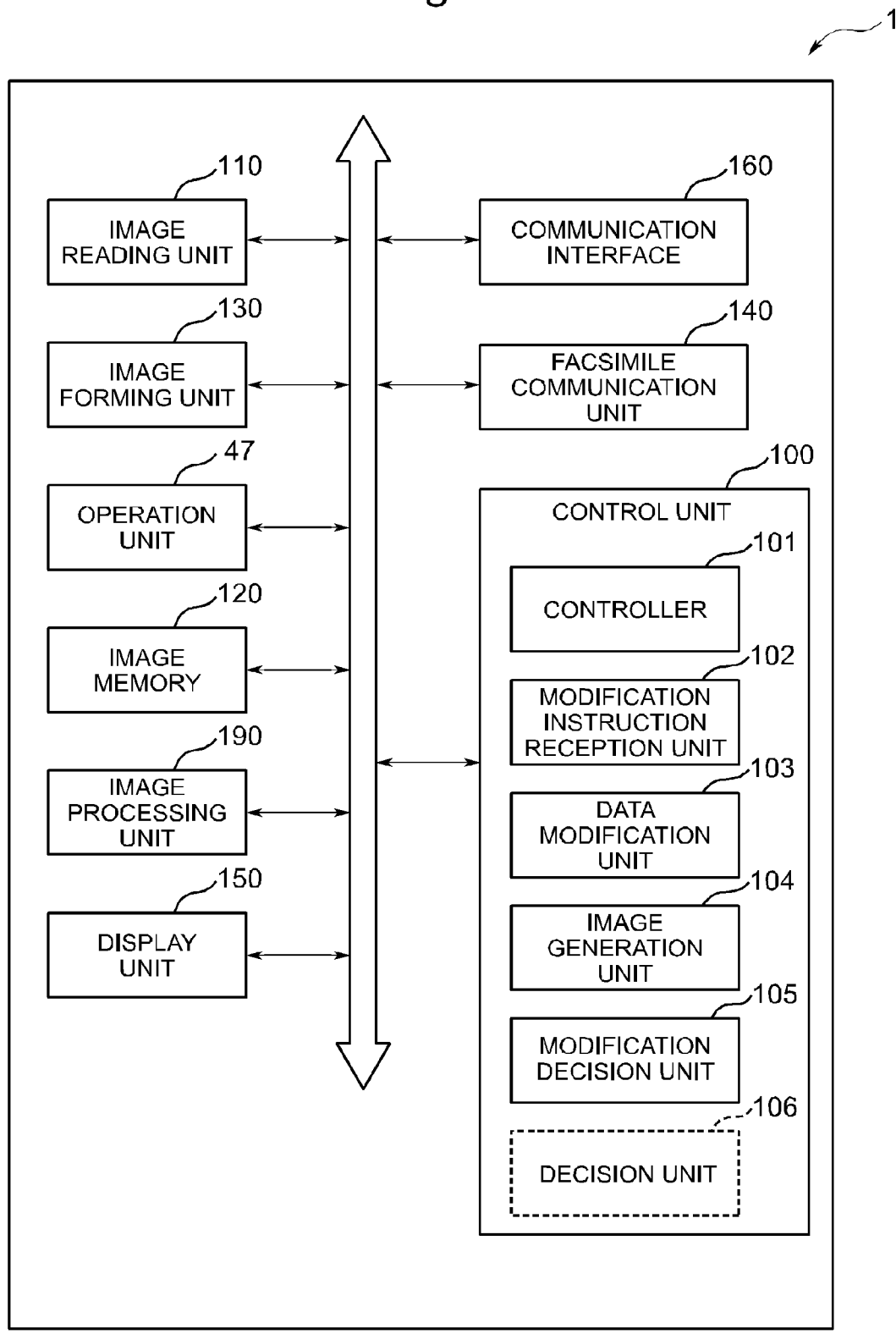
FIG. 8 is a block diagram showing an electrical configuration of a multifunctional peripheral according to a second embodiment.

FIG. 8 is a block diagram showing an electrical configuration of the multifunctional peripheral 1 according to the second embodiment.

Description of the same constituents as those of the first embodiment will not be repeated.

In the multifunctional peripheral 1 according to the second embodiment, the control unit 100 further includes an image generation unit 104 and a modification decision unit 105.

A decision unit 106 indicated by broken lines will be referred to in an embodiment to be subsequently described.

The image generation unit 104 generates an attribute information image representing attribute information of a header or a footer corresponding to each page on the basis of the page information accompanying each page.

The image generation unit 104 then synthesizes the generated attribute information image in a predetermined position in the data of the corresponding page.

The predetermined position refers to a position designated by the user in the image based on the data of each page, for example the center of the lower margin of the page.

The attribute information indicates a page number, the total number of pages, and so forth.

The modification decision unit 105 decides whether the attribute information of the data of each page has to be changed in the case where the data modification unit 103 performs the foregoing modification.

For example, in the case where the modification is the deletion and the second page out of the first to the fifth pages to be transmitted by facsimile is deleted, the pages to be transmitted by facsimile after the deletion are the first to the fourth pages. However, the original third, fourth and fifth pages are now the second, third, and fourth pages respectively, and hence the page number of those pages and the total number of pages are changed.

In another case, when the modification is the insertion and an additional page is inserted as the second page in the first to the fifth pages initially prepared for the facsimile transmission, the pages to be transmitted by facsimile after the insertion are the first to the sixth pages. However, the original second, third, fourth and fifth pages are now the third, fourth, fifth, and sixth pages respectively, and hence the page number of those pages and the total number of pages are changed.

Further, in the case where the modification is the exchange, since the order of the pages to be transmitted by facsimile is exchanged the respective page numbers of the exchanged pages are changed, however the total number of pages remains unchanged.

In contrast, in the case where the modification is the substitution and the second page out of the first to the fifth pages to be transmitted by facsimile is substituted with a new page, the page numbers of the respective pages also remain unchanged after the substitution is performed.

Thus, the modification decision unit 105 decides whether the attribute information such as the page number and the total number of pages of the data has to be changed because of the modification, on the basis of the type of the modification, increase or decrease in number of pages, and the information related to the pages designated as object of the modification.

In the case where the modification decision unit 105 decides that the attribute information has to be changed, the image generation unit 104 newly generates the attribute information images representing the attribute information including the page numbers and/or the total number of pages of the data subjected to the modification, and synthesizes the new attribute information images with the data of the corresponding pages stored in the image memory 120, as substitution for the original attribute information image.

In the case where the modification decision unit 105 decides that the attribute information has to be changed, the image generation unit 104 newly generates and synthesizes the attribute information images with respect to the untransmitted pages stored in the image memory 120, and also generates the new attribute information images with respect to the data of the pages already transmitted to the counterpart facsimile machine.

Further, the facsimile communication unit 140 transmits to the counterpart facsimile machine the newly generated attribute information images for the data of the pages already transmitted, together with a synthesis instruction to synthesize the attribute information image with the data of the corresponding pages.

In the case where data of new pages has been acquired through the modification, the facsimile communication unit 140 transmits the synthesis instruction to the counterpart facsimile machine, together with the data of the new pages.

The synthesis instruction may be generated, for example, by the data modification unit 103.

A facsimile transmission procedure performed by the multifunctional peripheral 1 according to the second embodiment will now be described hereunder.

Figure 9:
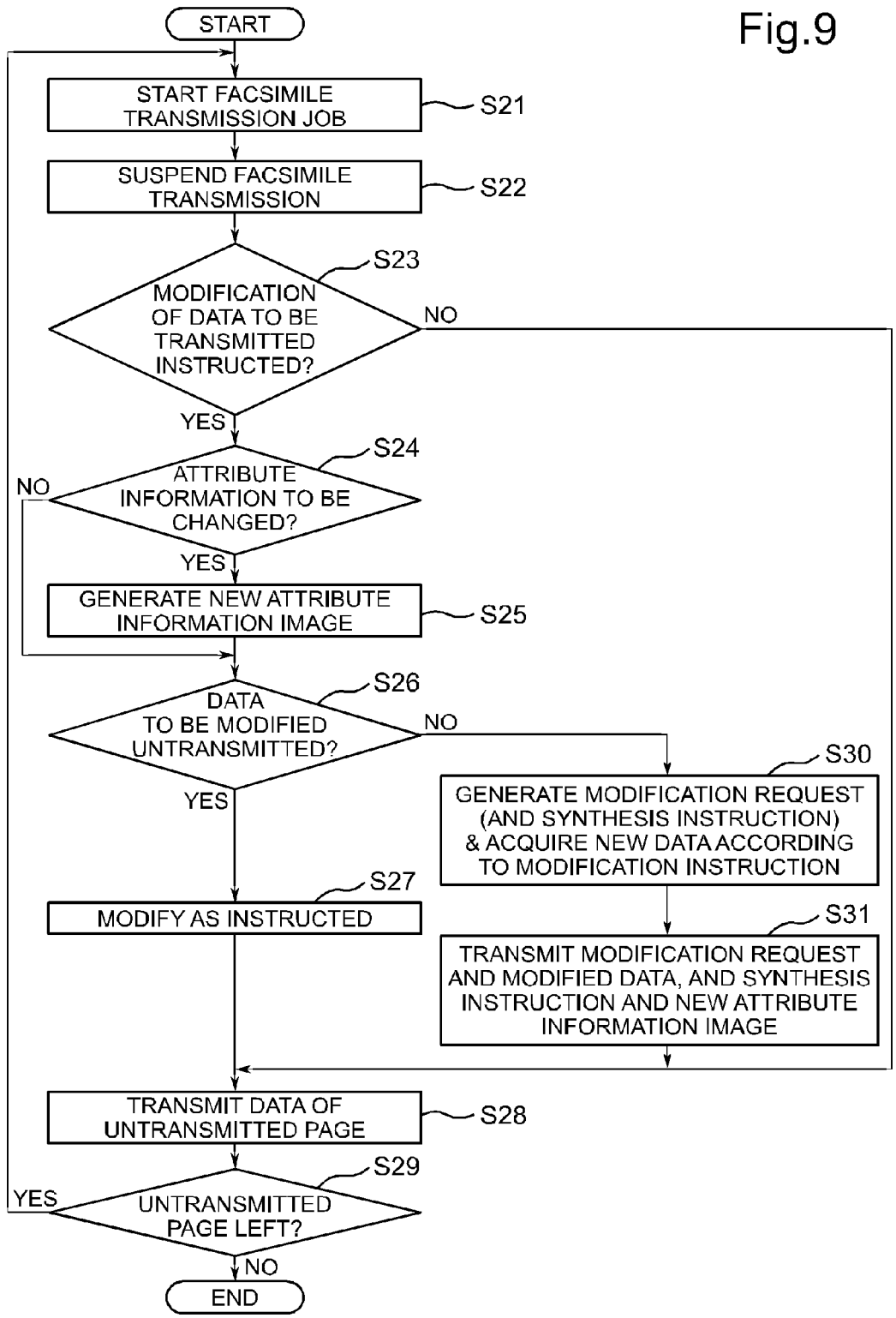
FIG. 9 is a flowchart showing a facsimile transmission procedure performed by the multifunctional peripheral according to the second embodiment.

FIG. 9 is a flowchart showing the facsimile transmission procedure performed by the multifunctional peripheral 1 according to the second embodiment;

Description of the same steps as those of the facsimile transmission procedure according to the first embodiment will not be repeated.

Figure 10:
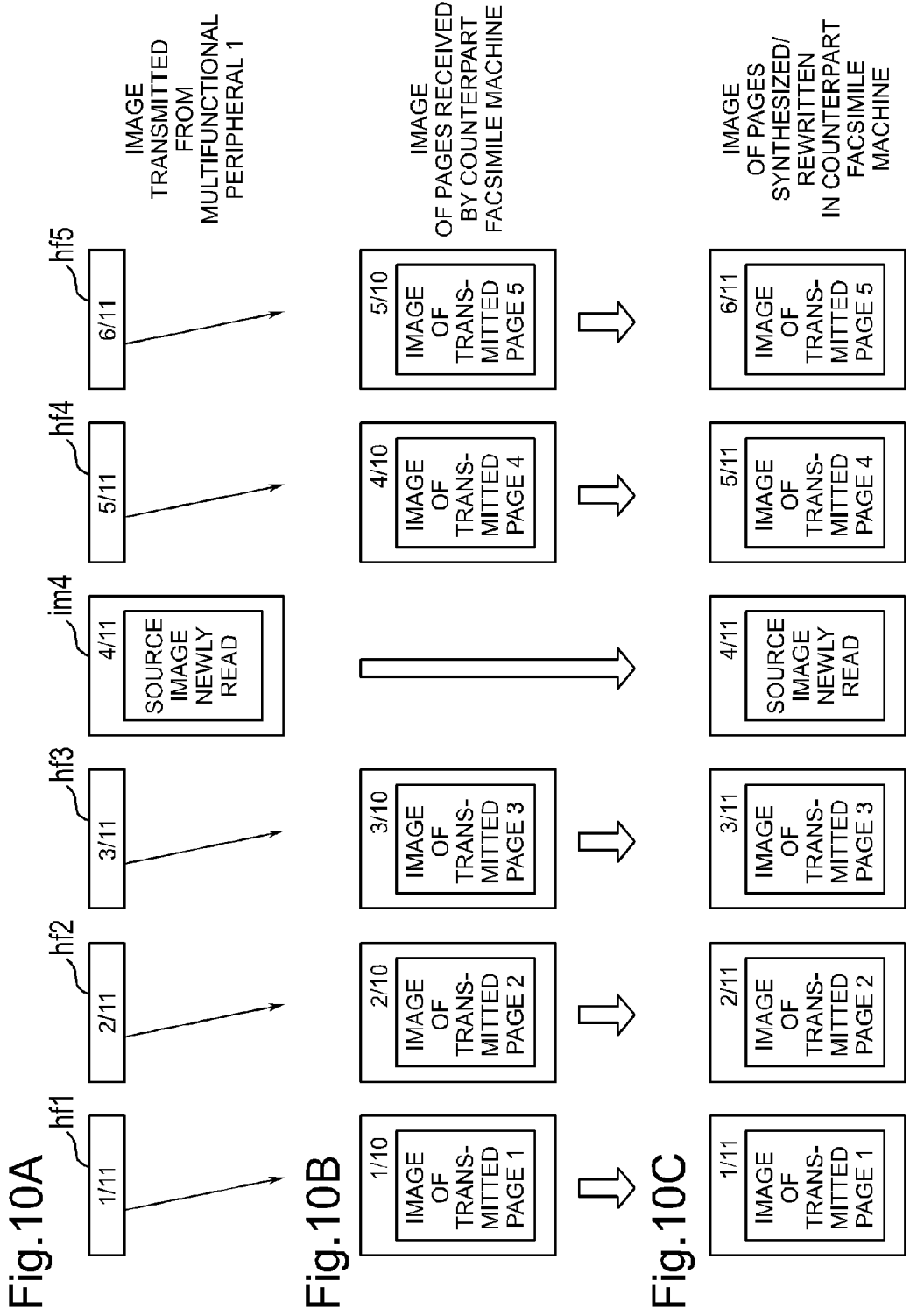
FIG. 10A is a drawing showing an attribute information image and an image of a new page to be transmitted from the multifunctional peripheral to the counterpart facsimile machine.
FIG. 10B is a drawing showing each of the pages already transmitted to the counterpart facsimile machine.
FIG. 10C is a drawing showing images of the pages rewritten in the counterpart facsimile machine by synthesizing the attribute information image.

FIG. 10A illustrates attribute information images and images of new pages to be transmitted from the multifunctional peripheral 1 to the counterpart facsimile machine, FIG. 10B illustrates the pages already transmitted to the counterpart facsimile machine, and FIG. 10C illustrates images of the pages rewritten in the counterpart facsimile machine by synthesizing the attribute information images.

When the user designates through the operation unit 47 a facsimile transmission job to be modified while the list of the accepted facsimile transmission jobs is displayed on the display unit 150, the controller 101 causes the display unit 150 to display the pages to be transmitted in the designated facsimile transmission job, classified into untransmitted pages and already transmitted pages (see FIG. 6).

When the user touches the operation unit 47 to select a page to be modified out of the untransmitted pages and designate the type of modification by pressing one of the "Deletion" button B1, the "Insert behind" button B2, the "Forward" button B3, the "Back" button B4, and the "Substitution" button B5 (YES at S23), the modification decision unit 105 decides whether the designated modification originates a change in the attribute information given to each of the pages (S24).

In the case where the modification decision unit 105 decides that the attribute information of any of the pages to be transmitted by facsimile has to be changed (YES at S24), the image generation unit 104 generates a new attribute information image for each page subjected to the modification (S25).

At this point, the image generation unit 104 may generate the new attribute information image with respect to only the data of the page the attribute information of which has been decided to be changed.

In the case where the modification decision unit 105 decides that the attribute information of none of the pages to be transmitted by facsimile has to be changed (NO at S24), the image generation unit 104 does not generate a new attribute information image.

The operation proceeds to S26 as described below.

The data modification unit 103 then decides whether the page designated by the user as object of the modification is untransmitted or has already been transmitted (S26).

In the case where the data modification unit 103 decides that the designated page is untransmitted yet (YES at S26), the data modification unit 103 modifies the data of each page stored in the image memory 120, in accordance with the modification instruction from the user (S27).

At this point, in the case where the image generation unit 104 generates the new attribute information image for each page, the image generation unit 104 synthesizes the attribute information image with the data of the corresponding page.

The data that has undergone the modification and the synthesis is stored in the image memory 120.

The controller 101 causes the facsimile communication unit 140 to transmit the data of each page stored in the image memory 120 to the designated counterpart facsimile machine (S28).

In the case where the data modification unit 103 decides that the modification instructed by the user is to be applied to the data already transmitted (NO at S26), the data modification unit 103 generates the modification request to cause the counterpart facsimile machine to perform the modification and, in the case where the new attribute information image has been generated, generates the synthesis instruction (S30).

The facsimile communication unit 140 transmits to the counterpart facsimile machine the modification request and, in the case where the data of the new page has been acquired for the modification, the data of the new source document with which the attribute information image has been synthesized by the image generation unit 104.

In the case where the new attribute information image has been generated for each page, the multifunctional peripheral 1 also transmits the attribute information image and the synthesis instruction to the counterpart facsimile machine (S31).

Thereafter, the operation proceeds to S28, where the facsimile communication unit 140 transmits the data of the untransmitted pages remaining in the image memory 120 to the counterpart facsimile machine (S28).

For example, in the case where data of a new one page is to be inserted (added) as the fourth page in the original ten pages so that the new total number of pages becomes eleven pages and the multifunctional peripheral 1 has already transmitted up to the fifth page to the counterpart facsimile machine, the facsimile communication unit 140 generates the attribute information including the page numbers and the total number of pages now modified to eleven pages, and generates the corresponding attribute information images, for example as shown in FIG. 10A (S31).

In this case, the facsimile communication unit 140 transmits, as data of the new page to be inserted, data im4 to which the changed attribute information image based on the new total number of eleven pages has been synthesized and, with respect to the first to the fifth pages already transmitted, the new page numbers corresponding to the respective pages and attribute information images hf1 to hf5 based on the new total number of eleven pages, to the counterpart facsimile machine.

Accordingly, in the counterpart facsimile machine the images of the original first to fifth pages shown in FIG. 10B are modified so as to include as the new fourth page the data im4 received from the multifunctional peripheral 1, to which the changed attribute information image has been synthesized, as shown in FIG. 10C. In addition, the attribute information image of the first page is rewritten with the attribute information image hf1 based on the new total number of eleven pages, the attribute information image of the second page is rewritten with the attribute information image hf2 based on the new total number of eleven pages, and the attribute information image of the third page is rewritten with the attribute information image hf3 based on the new total number of eleven pages.

Further, the attribute information image of the original fourth page is rewritten with the attribute information image hf4 based on the new total number of eleven pages so as to create a new fifth page, and the attribute information image of the original fifth page is rewritten with the attribute information image hf5 based on the new total number of eleven pages, so as to create a new sixth page.

The facsimile transmission procedure performed by the multifunctional peripheral 1 according to the second embodiment provides the following advantageous effects, in addition to those provided by the facsimile transmission procedure performed by the multifunctional peripheral 1 according to the first embodiment.

In the case where the modification decision unit 105 decides that the attribute information of the pages subjected to the modification has to be changed, the image generation unit 104 generates new attribute information images for each of the pages subjected to the modification, and modifies the data of each page stored in the image memory 120 and synthesizes the new attribute information images with the modified data. In addition, the facsimile communication unit 140 transmits the newly generated attribute information images and the synthesis instruction thereof to the counterpart facsimile machine, and therefore the counterpart facsimile machine can synthesize the attribute information images that accord with the page numbers and/or total number of pages of the data of the pages subjected to the modification, with the data of the pages already received and stored in the image memory.

The mentioned configuration allows, even when an error is found in the data to be transmitted by facsimile during the facsimile transmission of that data, the facsimile transmission job to be completed with the error corrected, and allows the counterpart facsimile machine to acquire the source images accompanied with the attribute information images that accord with the page numbers and/or total number of pages of the data in which the error has been corrected.

Hereunder, a variation of the facsimile transmission procedure performed by the multifunctional peripheral 1 according to the second embodiment will be described.

Figure 11:
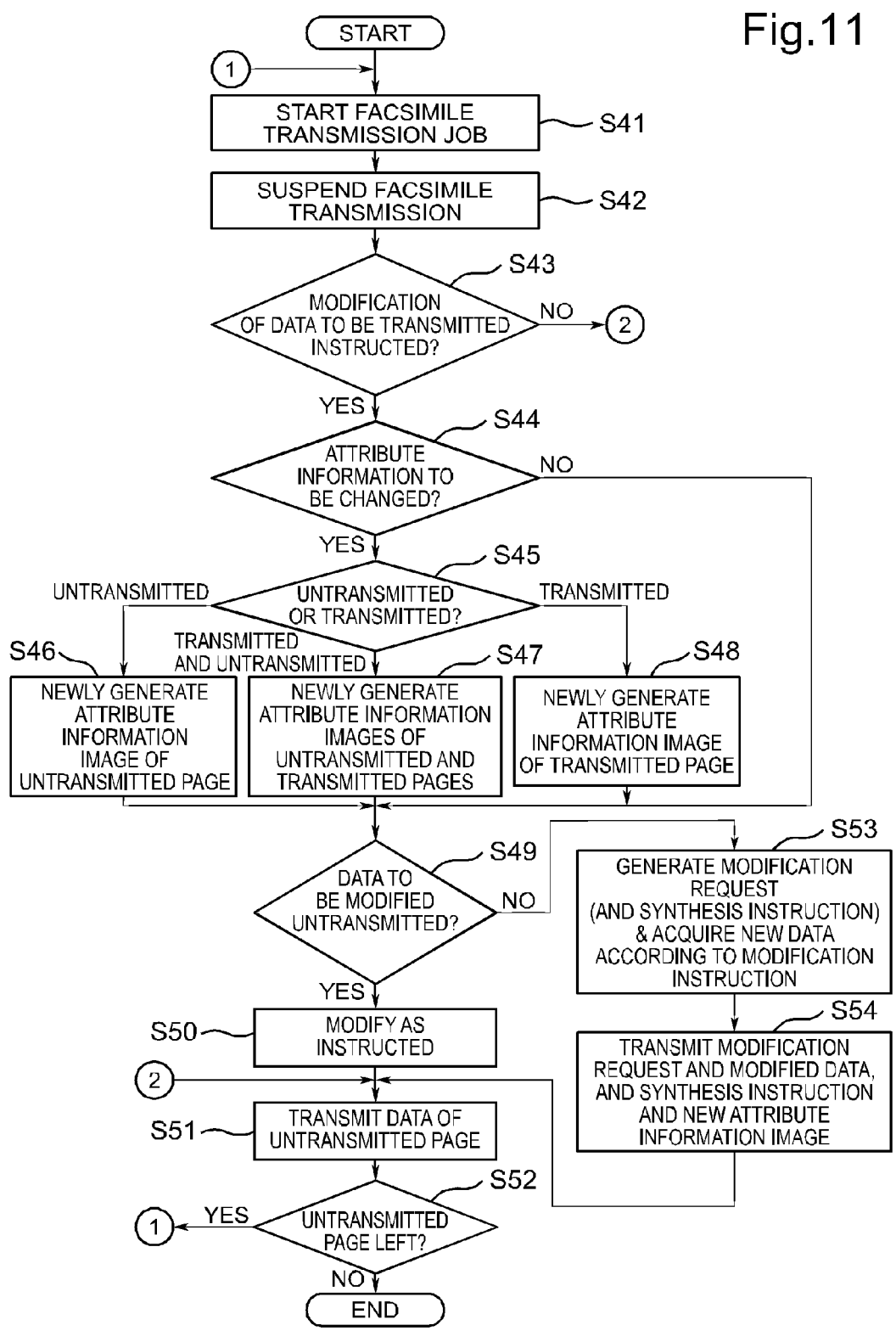
FIG. 11 is a flowchart showing a variation of the facsimile transmission procedure performed by the multifunctional peripheral according to the second embodiment.

FIG. 11 is a flowchart showing the variation of the facsimile transmission procedure performed by the multifunctional peripheral 1 according to the second embodiment.

Description of the same steps as those of the facsimile transmission procedure shown in FIG. 9 performed by the multifunctional peripheral 1 according to the second embodiment will not be repeated.

In the multifunctional peripheral 1 according to the second embodiment configured to perform the variation of the facsimile transmission procedure, the modification decision unit 105 decides whether the attribute information of the data already transmitted by the facsimile communication unit 140 has to be changed because of the modification made by the data modification unit 103.

Regarding the data of the untransmitted pages and the data of the already transmitted pages, the page information of each page is classified by the controller 101 into the information of the untransmitted page and the information of the already transmitted page, and stored in the image memory 120.

The modification decision unit 105 is capable of deciding, when the modification instruction is inputted by the user through the operation unit 47, whether the page designated as object of the modification by the modification instruction is untransmitted or has already been transmitted, according to the classification of the page information between the untransmitted one and already transmitted one made by the controller 101.

In this variation of the facsimile transmission procedure, in the case where the modification decision unit 105 decides that the attribute information of any of the pages to be transmitted by facsimile has to be changed (YES at S44), the decision unit 106 decides whether the data of the page the attribute information of which has to be changed is the untransmitted data or already transmitted data, or includes both of the untransmitted and already transmitted data (S45).

In the case where the modification decision unit 105 decides that the data of the page the attribute information of which has to be changed is the untransmitted data ("Untransmitted" at S45), the image generation unit 104 generates a new attribute information image that accords with the data of each page subjected to the modification, with respect to each of the untransmitted pages (S46), but does not generate a new attribute information image with respect to the data of the already transmitted pages.

In the case where the modification decision unit 105 decides that the data of the page the attribute information of which has to be changed includes both of the untransmitted and already transmitted data ("Untransmitted and Transmitted" at S45), the image generation unit 104 generates new attribute information images that accord with the data of the pages subjected to the modification, with respect to the data of both the untransmitted and already transmitted pages (S47).

In the case where the modification decision unit 105 decides that the data of the page the attribute information of which has to be changed is the already transmitted data ("Transmitted" at S45), the image generation unit 104 generates a new attribute information image that accords with the data of each page subjected to the modification, with respect to each of the already transmitted pages (S48), but does not generate a new attribute information image with respect to the data of the untransmitted pages.

After one of S46 to S48, the operation proceeds to S49 and thereafter (same as S26 and thereafter in FIG. 9).

In the case where the new attribute information images for the data of the already transmitted pages have not been generated, the data modification unit 103 does not generate the synthesis instruction to synthesize the attribute information images, and the facsimile communication unit 140 does not transmit the synthesis instruction and the attribute information image to the counterpart facsimile machine.

With the foregoing variation of the facsimile transmission procedure, the image generation unit 104 generates the new attribute information image only for the page that requires the new attribute information image because the attribute information is changed owing to the modification of the page, among the data of the untransmitted and already transmitted pages, depending on whether the page to be modified is untransmitted or has already been transmitted. Such an arrangement alleviates the processing load imposed on the image generation unit 104, because the image generation unit 104 has only to generate the attribute information image that is really necessary.

Further, since the facsimile communication unit 140 is kept from transmitting the attribute information image that does not need to be synthesized with the data stored in the counterpart facsimile machine, the processing load and the time for the facsimile transmission can be reduced.

The multifunctional peripheral 1 according to a third embodiment will now be described hereunder.

Figure 12:
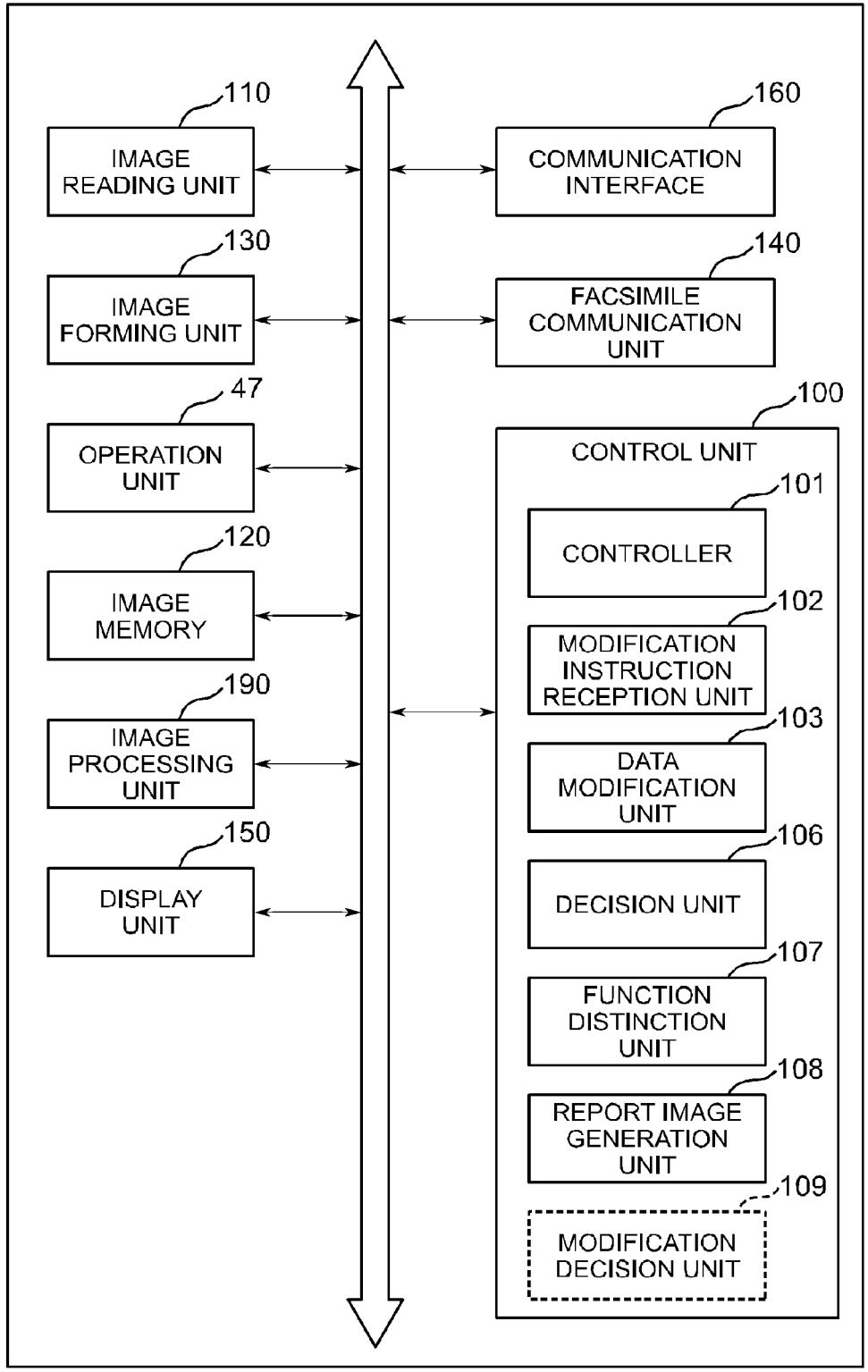
FIG. 12 is a block diagram showing an electrical configuration of a multifunctional peripheral according to a third embodiment.

FIG. 12 is a block diagram showing an electrical configuration of the multifunctional peripheral 1 according to the third embodiment.

Description of the same constituents as those of the first embodiment will not be repeated.

In the multifunctional peripheral 1 according to the third embodiment, the control unit 100 includes the decision unit 106, a function distinction unit 107, and a report image generation unit 108, in addition to the configuration of the multifunctional peripheral 1 according to the first embodiment. A modification decision unit 109 indicated by broken lines will be referred to in an embodiment to be subsequently described.

The decision unit 106 decides whether the data of the page designated as object of the modification by the data modification unit 103 is the data of the already transmitted page.

The function distinction unit 107 decides whether the counterpart facsimile machine of the facsimile transmission job being performed is a compatible machine, in the case where the decision unit 106 decides that the data to be modified is the data of the already transmitted page.

The compatible machine refers to a facsimile machine capable of performing the modification in accordance with the modification request transmitted from the multifunctional peripheral 1.

The function distinction unit 107 identifies whether the counterpart facsimile machine is the compatible machine, for example on the basis of function information included in the DIS signal from the counterpart facsimile machine received in response to the CNG signal transmitted from the facsimile communication unit 140 at the start of the facsimile communication with the counterpart facsimile machine.

In other words, in the case where the counterpart facsimile machine is the compatible machine, the counterpart facsimile machine includes the function information indicating that the counterpart facsimile machine is the compatible machine in the DIS signal to be transmitted to the multifunctional peripheral 1.

The report image generation unit 108 generates a report image representing the detail of the modification made by the data modification unit 103 for the counterpart facsimile machine of the facsimile transmission, in the case where the function distinction unit 107 decides that the counterpart facsimile machine is incapable of performing the modification (not a compatible machine).

In the case where the report image generation unit 108 has generated the report image, the facsimile communication unit 140 transmits the report image to the counterpart facsimile machine decided by the function distinction unit 107 to be incapable of performing the modification.

Hereunder, a facsimile transmission procedure performed by the multifunctional peripheral 1 according to the third embodiment will be described.

Figure 13:
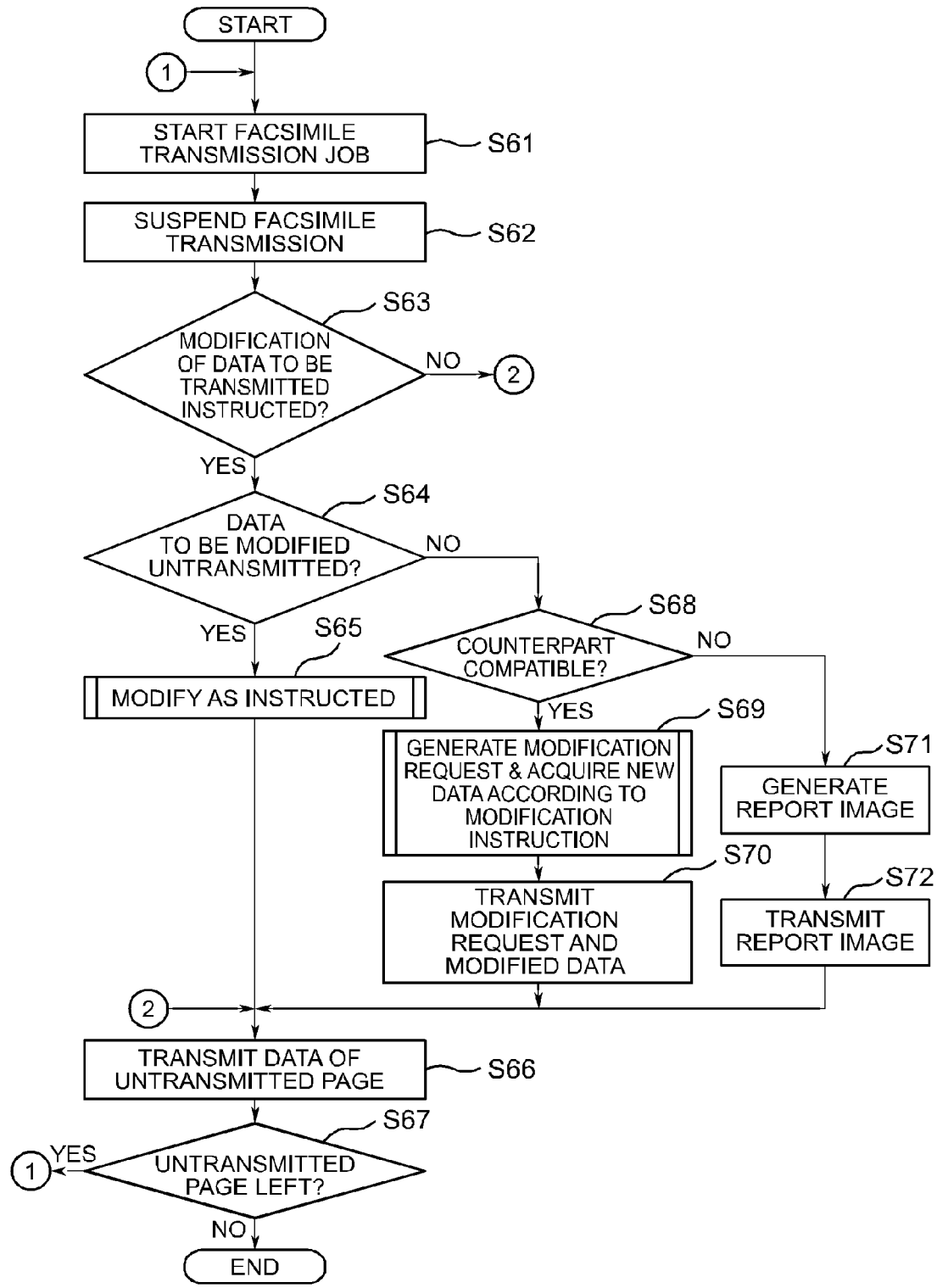
FIG. 13 is a flowchart showing a facsimile transmission procedure performed by the multifunctional peripheral according to the third embodiment.

FIG. 13 is a flowchart showing the facsimile transmission procedure performed by the multifunctional peripheral 1 according to the third embodiment.

Description of the same steps as those of the facsimile transmission procedure performed by the multifunctional peripheral 1 according to the first embodiment will not be repeated.

When the user designates through the operation unit 47 the type of the modification while the list of the accepted facsimile transmission jobs is displayed on the display unit 150 (YES at S63), the decision unit 106 decides whether the page designated by the user as object of the modification is untransmitted or has already been transmitted (S64).

In the case where the decision unit 106 decides that the modification instructed by the user is for the data of the already transmitted page (NO at S64), the function distinction unit 107 identifies whether the counterpart facsimile machine of the facsimile transmission job being performed is the compatible machine (S68).

In the case where the function distinction unit 107 identifies that the counterpart facsimile machine is the compatible machine (YES at S68), the data modification unit 103 generates the modification request (S69) and the facsimile communication unit 140 transmits, in the case where the data of the new page subjected to the modification has been acquired, the new data of the source document to the counterpart facsimile machine, together with the modification request (S70).

Then the operation proceeds to S66.

In contrast, when the function distinction unit 107 identifies that the counterpart facsimile machine is not the compatible machine (NO at S68), the report image generation unit 108 generates the report image (S71).

The facsimile communication unit 140 transmits the generated report image to the counterpart facsimile machine (S72).

Then the operation proceeds to S66, where the facsimile communication unit 140 transmits the data of the untransmitted pages stored in the image memory 120 to the counterpart facsimile machine (S66).

The facsimile communication unit 140 transmits the report image at S72 while the facsimile transmission of the data of the pages stored in the image memory 120 is suspended at S62, and therefore the report image is transmitted to the counterpart facsimile machine before the data of the page subjected to the modification is transmitted thereto.

Accordingly, the user of the counterpart facsimile machine can be made aware that the hard copies printed after the hard copy of the report image represent the data that has been modified during the facsimile transmission.

Here, the controller 101 may cause the facsimile communication unit 140 to transmit the generated report image as a page preceding the pages subjected to the modification, to the counterpart facsimile machine.

In this case, the user of the counterpart facsimile machine can be made aware that the hard copies of the next and the subsequent pages succeeding the hard copy of the report image represent the data that has been modified during the facsimile transmission.

For example, in the case where the user designates a page already transmitted to the counterpart facsimile machine as object of modification and the type of the modification is the deletion, the report image generation unit 108 generates the report image containing a message indicating the number of the page to be deleted, in accordance with the modification instruction.

Alternatively, for example, the report image generation unit 108 may read out the data of the page to be deleted from the image memory 120, and generate the report image representing the content of the page.

FIG. 14 illustrates an image formation result (printing result) obtained by the counterpart facsimile machine upon receipt of the report image from the facsimile communication unit 140.

As another example, in the case where the user designates pages already transmitted to the counterpart facsimile machine as object of modification and the type of the modification is the exchange, the report image generation unit 108 generates the report image containing a message indicating the numbers of the pages to be exchanged, in accordance with the modification instruction.

Alternatively, the report image generation unit 108 may read out the images of the pages to be exchanged from the image memory 120, and generate the report image containing the images of the pages.

FIG. 15 illustrates an example of the image formed by the counterpart facsimile machine upon receipt of the report image from the facsimile communication unit 140.

As another example, in the case where the user designates a page already transmitted to the counterpart facsimile machine as object of modification and the type of the modification is the substitution, the report image generation unit 108 generates the report image containing a message indicating the number of the page to be substituted and the page number of the data to be subsequently transmitted for substitution, in accordance with the modification instruction.

In this case, the report image generation unit 108 may generate the report image containing the images of the pages to be substituted.

FIG. 16 illustrates an example of the image formed by the counterpart facsimile machine upon receipt of the report image from the facsimile communication unit 140.

Further, in the case where the user designates a page already transmitted to the counterpart facsimile machine as object of modification and the type of the modification is the insertion, the report image generation unit 108 generates the report image containing a message indicating the position where the new page is to be inserted, in accordance with the modification instruction.

FIG. 17 illustrates an example of the image formed by the counterpart facsimile machine upon receipt of the report image from the facsimile communication unit 140.

In the facsimile transmission by the multifunctional peripheral 1 according to the third embodiment, the report image generation unit 108 generates the report image representing the changes caused by the modification and the facsimile communication unit 140 transmits the report image to the counterpart facsimile machine, in the case where the data of the page to be modified is the data already transmitted and the counterpart facsimile machine is incapable of performing the modification in accordance with the modification request transmitted from the multifunctional peripheral 1. Therefore, the user of the counterpart facsimile machine can confirm that the received pages have been subjected to the modification by visually reviewing the hard copies of the report image.

Consequently, the user of the counterpart facsimile machine can effectively utilize the hard copy of the report image, because the hard copy allows the user to recognize the detail of the modification applied to the hard copies printed by the counterpart facsimile machine, and to arrange the order of the pages accordingly.

Thus, the facsimile transmission procedure performed by the multifunctional peripheral 1 according to the third embodiment allows the receiving-end facsimile machine to finish the facsimile communication after receiving the report indicating that the received image of the source document has been subjected to modification, even when the data of each page is modified in the transmitting-end multifunctional peripheral 1 after the transmission of the data from the multifunctional peripheral 1 is started.

In the aforementioned facsimile transmission procedure, the report image is generated and transmitted each time the modification is performed, and hence the report image is transmitted, for example, as the page immediately preceding the page to be added, in the case where the modification is the insertion.

In this case, the user of the counterpart facsimile machine can be made clearly aware that the pages succeeding the report image have already been subjected to the modification.

Further, in the aforementioned facsimile transmission procedure, the modification is made and the report image is transmitted before the relevant facsimile transmission job is finished, and therefore the report is printed in the counterpart facsimile machine together with the hard copies of the data transmitted in the same facsimile transmission job. Such an arrangement facilitates the user of the counterpart facsimile machine to recognize, in view of the report, that the hard copies of the facsimile transmission job have been subjected to the modification.

For example, the user can easily recognize the modification applied to the hard copies upon sequentially reviewing the bundle of the recording sheets printed by the counterpart facsimile machine.

Hereunder, a variation of the facsimile transmission procedure performed by the multifunctional peripheral 1 according to the third embodiment will be described.

Figure 18:
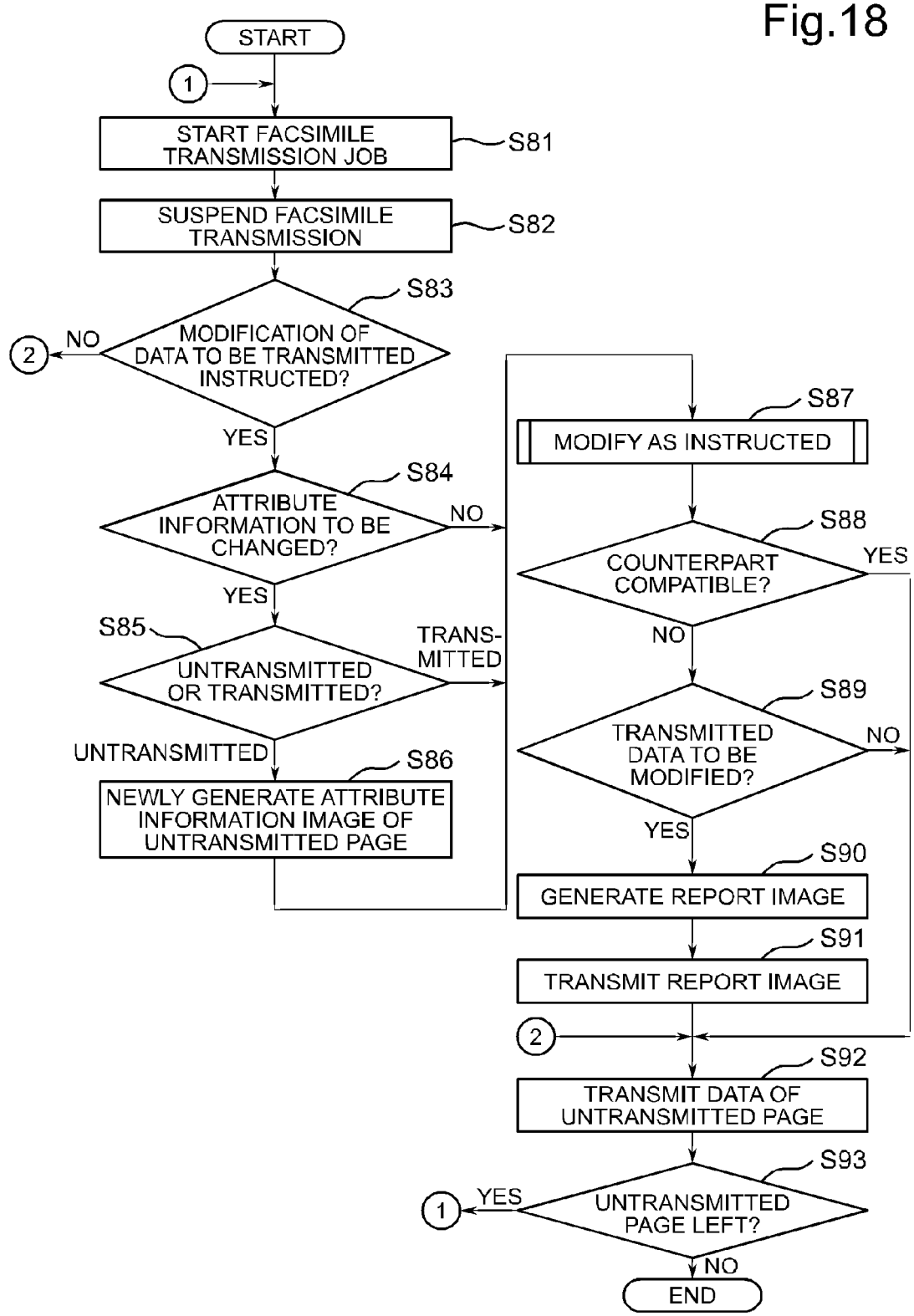
FIG. 18 is a flowchart showing another facsimile transmission procedure performed by the multifunctional peripheral according to the third embodiment.

FIG. 18 is a flowchart showing the variation of the facsimile transmission procedure performed by the multifunctional peripheral 1 according to the third embodiment.

Description of the same steps as those of the facsimile transmission procedure shown in FIG. 13 performed by the multifunctional peripheral 1 according to the third embodiment will not be repeated.

In the variation of the facsimile transmission procedure, the report image generation unit 108 generates the attribute information image with respect to the data of each page to be transmitted by facsimile.

The report image generation unit 108 synthesizes the attribute information image in the same way as does the image generation unit 104.

The multifunctional peripheral 1 according to the third embodiment further includes the modification decision unit 109 indicated by the broken lines in FIG. 12 provided in the control unit 100, for performing this variation of the facsimile transmission procedure.

The modification decision unit 109 decides whether the modification performed by the data modification unit 103 originates a change in the attribute information of the header or footer of the already transmitted pages.

When the user designates the type of the modification through the operation unit 47 while the facsimile transmission job is being performed (YES at S83), the modification decision unit 109 decides whether the designated modification originates a change in the attribute information accompanying the data of each page (S84).

In the case where the modification decision unit 109 decides that the attribute information of any of the pages to be transmitted by facsimile has to be changed (YES at S84), the modification decision unit 109 decides whether the page with the attribute information that has to be changed because of the modification is untransmitted or has already been transmitted (S85).

Here, in the case where the modification decision unit 109 decides that the attribute information of none of the pages to be transmitted by facsimile has to be changed (NO at S84), the operation proceeds to S87.

In the case where the modification decision unit 109 decides that the page the attribute information of which has to be changed is an untransmitted page ("Untransmitted" at S85), the report image generation unit 108 newly generates the attribute information image with respect to only the data of the untransmitted page (S86).

At this point, the report image generation unit 108 does not generate the attribute information image with respect to the data of the already transmitted pages.

Here, the modification decision unit 109 may decide that the page with the attribute information that has to be changed is untransmitted at S85, in the case where the attribute information of both the untransmitted page and the already transmitted page has to be changed.

Then the operation proceeds to S87.

In the case where the modification decision unit 109 decides that the page the attribute information of which has to be changed is an already transmitted page ("Transmitted" at S85), the report image generation unit 108 does not generate the attribute information image corresponding to the pages subjected to the modification, with respect to the data of both the untransmitted pages and already transmitted pages.

Then the operation proceeds to S87.

The data modification unit 103 modifies the data of the untransmitted pages stored in the image memory 120, according to the type of the modification instructed by the user (S87).

Alternatively, in the case where the modification instructed by the user is to be applied to the data of already transmitted pages, the data modification unit 103 acquires data of a new page using the image reading unit 110 and performs the modification (S87).

In the case where the image generation unit 104 has generated the new attribute information images for each page at this point, the image generation unit 104 synthesizes the new attribute information image with the data of the corresponding pages.

The data obtained through the modification is stored in the image memory 120.

Then the function distinction unit 107 decides whether the counterpart facsimile machine of the facsimile transmission job being performed is the compatible machine (S88).

In the case where the function distinction unit 107 decides that the counterpart facsimile machine is the compatible machine (YES at S88), the controller 101 causes the facsimile communication unit 140 to transmit the data of each page subjected to the modification and stored in the image memory 120, to the designated counterpart facsimile machine (S92).

In contrast, in the case where the function distinction unit 107 decides that the counterpart facsimile machine is not the compatible machine (NO at S88), the function distinction unit 107 decides whether the modification originates a change in the data of already transmitted pages (S89), and in the case where the function distinction unit 107 decides that the modification originates a change in the data of already transmitted pages (YES at S89), the report image generation unit 108 generates the report image (S90).

The facsimile communication unit 140 then transmits the generated report image to the counterpart facsimile machine (S91).

The controller 101 causes the facsimile communication unit 140 to transmit the data of each page subjected to the modification and stored in the image memory 120, to the designated counterpart facsimile machine (S92).

For example, in the case where the data of the page already transmitted to the counterpart facsimile machine is designated as object of modification by the user and the type of the modification is the deletion, the report image generation unit 108 generates, in accordance with the modification instruction, the report image including a message indicating the number of the page to be deleted, and also a message indicating the position where the attribute information is to be modified and the detail of the modification.

Figure 19:
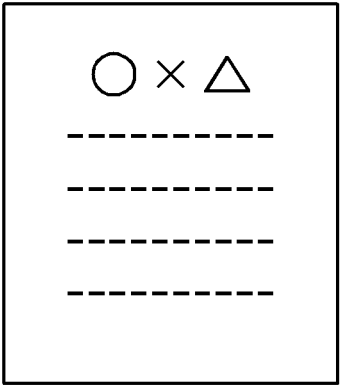
FIG. 19 is a drawing showing a result of image formation based on a report image received.

FIG. 19 illustrates an example of the image formed by the counterpart facsimile machine upon receipt of the report image from the multifunctional peripheral 1.

As another example, in the case where the data of the page already transmitted to the counterpart facsimile machine is designated as object of modification by the user and the type of the modification is the insertion, the report image generation unit 108 generates, in accordance with the modification instruction, the report image including a message indicating the position for the insertion, and also a message indicating the position where the attribute information is to be modified and the detail of the modification.

FIG. 20 illustrates an example of the image formed by the counterpart facsimile machine upon receipt of the report image from the multifunctional peripheral 1.

Further, in the case where the data of the page untransmitted yet to the counterpart facsimile machine is designated as object of modification by the user and the type of the modification is the deletion, the report image generation unit 108 generates, in accordance with the modification instruction, the report image including a message indicating the position where the attribute information is to be modified and the detail of the modification.

FIG. 21 illustrates an example of the image formed by the counterpart facsimile machine upon receipt of the report image from the multifunctional peripheral 1.

Regarding the attribute information images indicating the page numbers and/or the total number of pages changed owing to the modification, the report image generation unit 108 generates only those corresponding to the untransmitted pages stored in the image memory 120 of the multifunctional peripheral 1, in the foregoing embodiment. In other words, the report image generation unit 108 generates the attribute information images only with respect to the pages that can be modified before being transmitted to the counterpart facsimile machine, and therefore generation of unnecessary attribute information image can be avoided.

Further, the page numbers and/or the total number of pages changed owing to the modification can be securely reported to the counterpart facsimile machine, by transmitting the report image generated at S90.

A configuration of the counterpart facsimile machine which is the compatible machine will now be described hereunder.

Figure 22:
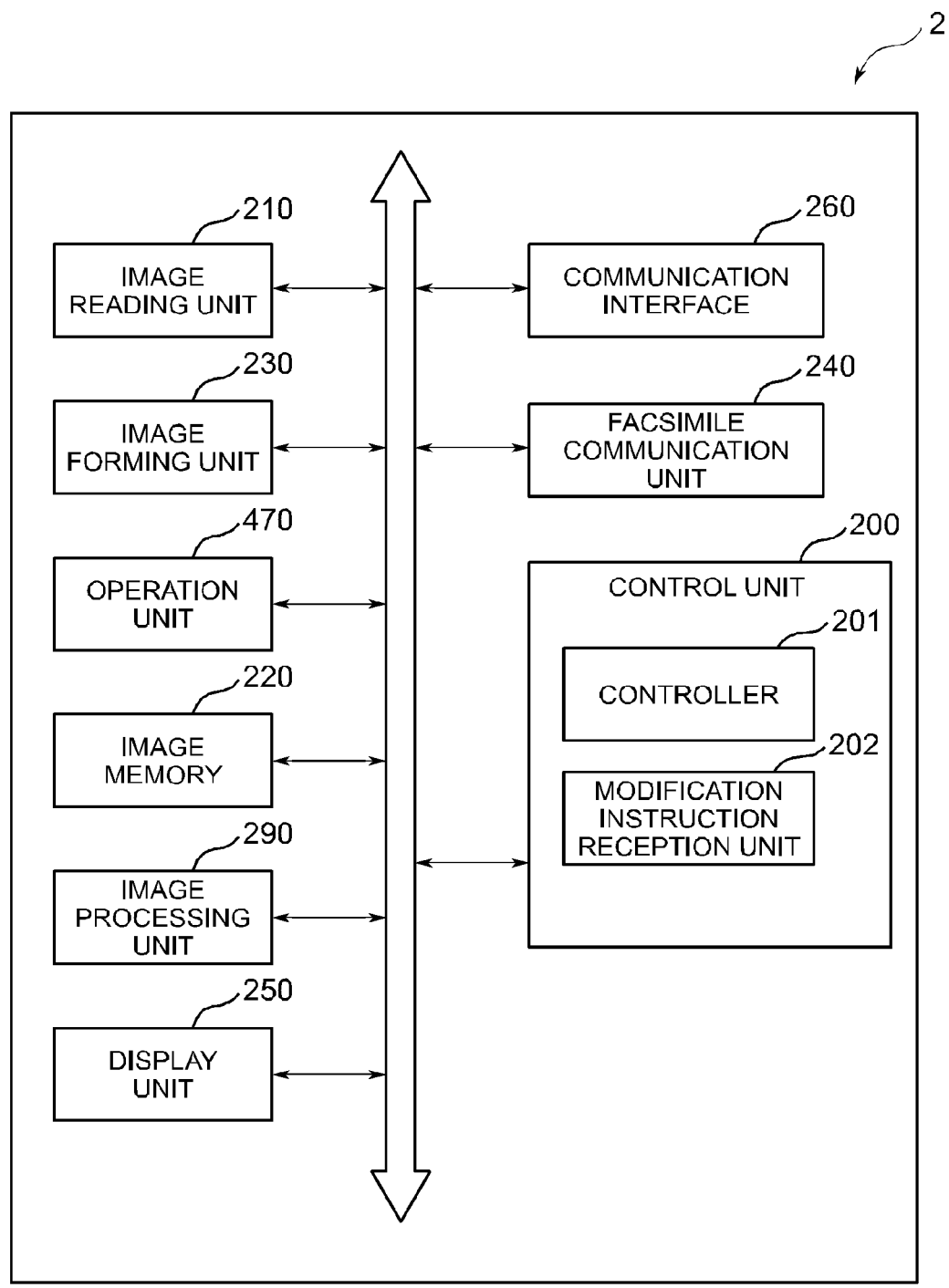
FIG. 22 is a block diagram showing a configuration of the counterpart facsimile machine.

FIG. 22 is a block diagram showing the configuration of the counterpart facsimile machine.

Description of the same constituents as those of the multifunctional peripheral 1 will not be repeated.

A receiving-end multifunctional peripheral 2 acting as the counterpart facsimile machine stores the source image of each page in an image memory 220 when a facsimile communication unit 240 receives the source image from the transmitting-end multifunctional peripheral 1.

The receiving-end multifunctional peripheral 2 includes a modification unit 202 provided in a control unit 200.

In the case where the facsimile communication unit 240 receives the modification request to modify the source image of each page stored in the image memory 220 while the receiving-end multifunctional peripheral 2 is performing the facsimile communication job for receiving the source image from the transmitting-end multifunctional peripheral 1, the modification unit 202 modifies the source image of each page stored in the image memory 220 in accordance with the modification request.

For example, when the facsimile communication unit 240 receives the modification request of "Insert behind" from the multifunctional peripheral 1, the modification unit 202 stores the data of the new page received from the multifunctional peripheral 1 together with the modification request in the image memory 220, as data succeeding the page stored therein and designated by the modification request.

As another example, when the facsimile communication unit 240 receives the modification request of "Forward" from the multifunctional peripheral 1, the modification unit 202 changes the order of the pages stored in the image memory 220, by moving the data of the page designated by the modification request to ahead of the preceding page.

As another example, when the facsimile communication unit 240 receives the modification request of "Back" from the multifunctional peripheral 1, the modification unit 202 changes the order of the pages stored in the image memory 220, by moving the data of the page designated by the modification request to behind the previous page.

As still another example, when the facsimile communication unit 240 receives the modification request of "Substitution" from the multifunctional peripheral 1, the modification unit 202 substitutes the data stored in the image memory 220 and corresponding to the page number designated by the modification request, with the data of the new page received from the multifunctional peripheral 1 together with the modification request.

Further, in the case where the facsimile communication unit 240 receives the modification request of "Deletion" from the multifunctional peripheral 1, the modification unit 202 deletes the data stored in the image memory 220 and corresponding to the page number designated by the modification request.

Further, in the case where the facsimile communication unit 240 receives the attribute information image from the multifunctional peripheral 1 together with the synthesis instruction, the modification unit 202 rewrites the attribute information image accompanying each page stored in the image memory 220 to the new attribute information image received, in accordance with the synthesis instruction.

The controller 201 causes the image forming unit 230 to form images, from the data of each page stored in the image memory 220 including the data of the pages subjected to the modification by the modification unit 202.

Further, in the case where the facsimile communication unit 240 receives from the multifunctional peripheral 1, while the receiving-end multifunctional peripheral 2 is performing the facsimile communication job for receiving the source image from the multifunctional peripheral 1, the new attribute information image representing the attribute information of the header or footer of the source image of each page stored in the image memory 220 as the modification request, and the synthesis instruction to rewrite the original attribute information image of the corresponding page to the new attribute information image and synthesize the new attribute information image with the corresponding page, the modification unit 202 substitutes the original attribute information image of the page designated by the synthesis instruction among the pages stored in the image memory 120, with the new attribute information image and synthesizes the new attribute information image with the corresponding page.

Hereunder, a facsimile reception procedure performed by the receiving-end multifunctional peripheral 2 will be described.

FIG. 23 is a flowchart showing the facsimile reception procedure performed by the receiving-end multifunctional peripheral 2.

In the receiving-end multifunctional peripheral 2, when the facsimile communication unit 240 receives the source image of each page from the transmitting-end multifunctional peripheral 1 (S101) as a result of the execution of the facsimile transmission job by the multifunctional peripheral 1, and the source image of each page is stored in the image memory 120 (S102).

When the facsimile communication unit 240 receives the DCN signal indicating the completion of the facsimile transmission from the transmitting-end multifunctional peripheral 1, after receiving the data of all the pages corresponding to the current facsimile transmission job from the multifunctional peripheral 1 (YES at S103), the modification unit 202 decides whether the facsimile communication unit 240 has received a modification request from the multifunctional peripheral 1 with respect to any of the pages of the source image received from the multifunctional peripheral 1 and stored in the image memory 220 in the current facsimile communication (S104).

In other words, the modification unit 202 decides whether the facsimile communication unit 240 has received the modification request from the transmitting-end multifunctional peripheral 1, while the receiving-end multifunctional peripheral 2 is performing the facsimile communication job for receiving the source image from the multifunctional peripheral 1.

In the case where the modification unit 202 decides that the modification request has been received (YES at S104), the modification unit 202 modifies the data of each page stored in the image memory 220, in accordance with the detail of the modification request (S105).

In the case where the facsimile communication unit 240 has not received the modification request from the transmitting-end multifunctional peripheral 1 (NO at S104), S105 is not performed.

Then the modification unit 202 decides whether the facsimile communication unit 240 has received a synthesis instruction for substituting the attribute information image and a new attribute information image used for the substitution, from the transmitting-end multifunctional peripheral 1 (S106).

In other words, the modification unit 202 decides whether the facsimile communication unit 240 has received the synthesis instruction and the new attribute information image from the transmitting-end multifunctional peripheral 1, while the receiving-end multifunctional peripheral 2 is performing the facsimile communication job for receiving the source image from the multifunctional peripheral 1.

In the case where the modification unit 202 decides that the facsimile communication unit 240 has received the synthesis instruction for substituting the attribute information image and the new attribute information image used for the substitution from the transmitting-end multifunctional peripheral 1 (YES at S106), the modification unit 202 synthesizes the new attribute information image with the data of the corresponding page in accordance with the detail of the synthesis instruction, thereby substituting the original attribute information image with the new attribute information image (S107). In the case of "No at S106", the process of S107 is omitted.

Then the controller 201 causes the image forming unit 230 to form the source image of each page stored in the image memory 220 in the order of the pages, on the basis of the data of the pages subjected to the modification in the case where the signal indicating the completion of the transmission of all the pages is received from the multifunctional peripheral 1 and the modification is performed, or on the basis of the data of the substituted pages in the case where the substitution is performed (S108).

Upon forming the images as above, the receiving-end multifunctional peripheral 2 completes the facsimile communication job for receiving the source image from the multifunctional peripheral 1.

The aforementioned configuration allows the receiving-end multifunctional peripheral 2, even when the data of the page to be transmitted by facsimile is modified in the transmitting-end multifunctional peripheral 1 after the transmitting-end multifunctional peripheral 1 started the facsimile transmission of the data of each page, to complete the facsimile transmission job after printing the source image based on the data of the modified pages.

Here, a communication system including the multifunctional peripheral 1 according to any of the first to the third embodiments as transmitting-end facsimile machine and the multifunctional peripheral 2 as receiving-end facsimile machine also constitutes an embodiment of the disclosure.

The disclosure may be modified in various manners without limitation to the foregoing embodiments.

The specific configurations and processes described with reference to FIGS. 1 through 23 are merely exemplary embodiments of the disclosure, and the configurations and processes of the disclosure are in no way limited to those embodiments.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A facsimile machine comprising:
 a data acquisition unit that acquires data to be transmitted by facsimile with respect to each of one or more pages, together with page information of the data;
 a storage unit that temporarily stores therein the data acquired by the data acquisition unit;
 a facsimile communication unit that reads out the data temporarily stored in the storage unit with respect to each page, and performs facsimile transmission of the data of each page to a designated counterpart facsimile machine, in the order of the pages;
 a modification instruction reception unit that accepts, while the facsimile communication unit is performing the facsimile transmission to the counterpart, a modification instruction to modify the data of already transmitted and untransmitted pages, with respect to each page; and
 a data modification unit that modifies the data of one or more pages designated as object of modification according to the modification instruction accepted by the modification instruction reception unit, while the facsimile communication unit is performing the facsimile transmission of the acquired data to the counterpart.

2. The facsimile machine according to claim 1,
 wherein, in the case where the data of the page designated as object of the modification by the modification instruction is the data of the untransmitted page, the data modification unit modifies the data of the designated page among the data of the pages stored in the image memory in accordance with the modification instruction, and the facsimile communication unit reads out the data of each page stored in the storage unit including the page that has been modified, in the order of the pages, and transmits the data to the counterpart facsimile machine.

3. The facsimile machine according to claim 2, wherein, in the case where the data of the page designated as object of the modification by the modification instruction is the data of the already transmitted page, the data modification unit generates a modification request for requesting the counterpart facsimile machine to modify the data of the designated page in accordance with the modification instruction, and the facsimile communication unit reads out the data of each page stored in the storage unit including the page that has been modified, in the order of the pages, and transmits the data to the counterpart facsimile machine together with the modification request.

4. The facsimile machine according to claim 3, wherein, in the case where the modification instruction accepted by the modification instruction reception unit is insertion or substitution of the data of each untransmitted page, the data acquisition unit acquires new data to be used for the insertion or the substitution, and the data modification unit performs the insertion or the substitution of the acquired data with respect to the data of an associated page stored in the storage unit.

5. The facsimile machine according to claim 4,

Wherein, in the case where the modification instruction accepted by the modification instruction reception unit is the insertion or the substitution of the data of each already transmitted page, the data acquisition unit acquires new data to be used for the insertion or the substitution, the data modification unit generates a modification request for requesting the insertion or the substitution of the acquired data, and the facsimile communication unit transmits the generated modification request and the new data acquired by the data acquisition unit to the counterpart facsimile machine.

6. The facsimile machine according to claim 1, further comprising:

an image generation unit that generates an attribute information image representing attribute information of a header or a footer corresponding to each page and synthesizes the attribute information image with the data of each page acquired by the data acquisition unit; and a modification decision unit that decides whether the modification performed by the data modification unit originates a change in the attribute information of the acquired data of each page, wherein, in the case where the modification decision unit decides that the attribute information is charged, the image generation unit newly generates the attribute information image for the data of each page subjected to the modification and synthesizes the new attribute information image with the data of the corresponding page among the pages stored in the storage unit, and the facsimile communication unit transmits the attribute information images newly generated for the data of the already transmitted page to the counterpart facsimile machine, together with a synthesis instruction to synthesize the attribute information image with the data of the corresponding page.

7. The facsimile machine according to claim 6, wherein the modification decision unit decides whether the modification performed by the data modification unit originates a change in the attribute information of the data untransmitted by the facsimile communication unit, and the image generation unit newly generates the attribute information image for the data of the untransmitted page in the case where the modification decision unit decides that the attribute information is changed only with respect to the untransmitted data, and the facsimile communication unit is kept from transmitting the attribute information image and the synthesis instruction for the data of the already transmitted page.

8. The facsimile machine according to claim 7, further comprising:

a decision unit that decides whether the modification performed by the data modification unit originates a change in the attribute information of the data already transmitted by the facsimile communication unit, wherein, in the case where the decision unit decides that the attribute information is changed with respect to the already transmitted data, the image generation unit newly generates the attribute information image for the data of already transmitted page, and the facsimile communication unit transmits the newly generated attribute information image to the counterpart facsimile machine together with the synthesis instruction.

9. The facsimile machine according to claim 8, wherein, in the case where the decision unit decides that the attribute information of the already transmitted data is not to be changed, the image generation unit is kept from generating the attribute information image for the data of the already transmitted page, and the facsimile communication unit is kept from transmitting the attribute information image and the synthesis instruction to the counterpart facsimile machine.

10. The facsimile machine according to claim 1, further comprising:

a decision unit that decides whether the data of the page designated as object of the modification by the data modification unit is the data of the already transmitted page;

a function distinction unit that decides whether the counterpart facsimile machine is capable of modifying the data of a received page in accordance with the modification request transmitted from the facsimile machine, in the case where the decision unit decides that the data to be modified is the data of the already transmitted page; and a report image generation unit that generates a report image to be provided to the counterpart facsimile machine and representing the modification made by the data modification unit, in the case where the function distinction unit decides that the counterpart facsimile machine is incapable of performing the modification, wherein the facsimile communication unit transmits the report image to the counterpart facsimile machine decided to be incapable of performing the modification, when the report image generation unit generates the report image.

11. The facsimile machine according to claim 10, further comprising:

a modification decision unit that decides whether the modification performed by the data modification unit originates a change in the attribute information of a header or a footer of the already transmitted data, wherein the report image generation unit generates the report image including information to the effect that the attribute information is changed in the case where the function distinction unit decides that the counterpart facsimile machine is incapable of performing the modification, and the modification decision unit decides that the attribute information for the already transmitted data is changed.

12. The facsimile machine according to claim 11, wherein the report image generation unit is kept from generating the report image in the case where the modification decision unit decides that the attribute information for the already transmitted data is not changed, even when the function distinction unit decides that the counterpart facsimile machine is incapable of performing the modification.

13. The facsimile machine according to claim 12, wherein the facsimile communication unit transmits the report image to the counterpart facsimile machine, as a page to be placed at a position anterior to the page to be modified according to the modification request.

14. The facsimile machine according to claim 13, wherein the facsimile communication unit transmits the report image to the counterpart facsimile machine, as a page to be placed immediately anterior to the page to be modified according to the modification request.

15. A communication system comprising:
a transmitting-end facsimile machine; and
a receiving-end facsimile machine,
wherein the transmitting-end facsimile machine includes:
a data acquisition unit that acquires data to be transmitted by facsimile with respect to each of one or more pages, together with page information of the data;
a storage unit that temporarily stores therein the data acquired by the data acquisition unit;
a facsimile communication unit that reads out the data temporarily stored in the storage unit with respect to each page, and performs facsimile transmission of the data of each page to a designated counterpart facsimile machine, in the order of the pages;
a modification instruction reception unit that accepts, while the facsimile communication unit is performing the facsimile transmission to the counterpart, a modification instruction to modify the data of already transmitted and untransmitted pages, with respect to each page; and
a data modification unit that modifies the data of one or more pages designated as object of modification according to the modification instruction accepted by the modification instruction reception unit, while the facsimile communication unit is performing the facsimile transmission of the acquired data to the counterpart, and
the receiving-end facsimile machine includes:
a data reception unit that receives a source image together with page information from another facsimile machine, with respect to each of one or more pages;
a received data storage unit that temporarily stores therein the source image of each page received by the data reception unit;
a modification unit that modifies, when the data reception unit receives from the another facsimile machine a modification request to modify the source image of each page stored in the received data storage unit while receiving the source image from the another facsimile machine, the source image of each page stored in the received data storage unit in accordance with the modification request; and
an image forming unit that forms an image from the modified source image of each page stored in the received data storage unit.

16. A communication system comprising:
a transmitting-end facsimile machine; and
a receiving-end facsimile machine,
wherein the transmitting-end facsimile machine includes:
a data acquisition unit that acquires data to be transmitted by facsimile with respect to each of one or more pages, together with page information of the data;
an image generation unit that generates an attribute information image representing attribute information of a header or a footer corresponding to each page and synthesizes the attribute information image with the data of each page acquired by the data acquisition unit;
a storage unit that temporarily stores therein the data of each page synthesized with the attribute information image by the image generation unit;
a facsimile communication unit that reads out the data temporarily stored in the storage unit with respect to each page, and performs facsimile transmission of the data of each page to a designated counterpart facsimile machine, in the order of the pages;
a modification instruction reception unit that accepts, while the facsimile communication unit is performing the facsimile transmission to the counterpart, a modification instruction to modify the data of already transmitted and untransmitted pages, with respect to each page;
a data modification unit that modifies the data of one or more pages designated as object of modification according to the modification instruction accepted by the modification instruction reception unit, while the facsimile communication unit is performing the facsimile transmission of the acquired data to the counterpart;
a modification decision unit that decides whether the attribute information of the data of each page is to be modified because of the modification made by the data modification unit,
the image generation unit newly generates, when the modification decision unit decides that the attribute information is to be modified, an attribute information image for the modified data of each page and synthesizes the newly generated attribute information image with the data of the corresponding page among the data of the pages stored in the storage unit, and the facsimile communication unit transmits the attribute information image newly generated for the data of the already transmitted page to the counterpart facsimile machine, together with a synthesis instruction to synthesize the new attribute information image with the data of the corresponding page,
the receiving-end facsimile machine includes:
a data reception unit that receives a source image together with page information from another facsimile machine, with respect to each of one or more pages;
a received data storage unit that temporarily stores therein the source image of each page received by the data reception unit;
a modification unit that modifies, when the data reception unit receives from the another facsimile machine a modification request to modify the source image of each page stored in the received data storage unit while receiving the source image from the another facsimile machine, the source image of each page stored in the received data storage unit in accordance with the modification request;
an image forming unit forms an image from the modified source image of each page stored in the received data storage unit, and the modification unit substitutes the original attribute information image of the source image of the page designated by the substitution instruction among the source images of the pages stored in the received data storage unit, with the new attribute information image, when the data reception unit receives, from the another facsimile machine as the modification request, the new attribute information image representing the attribute information of the header or the footer of the source image of each page stored in the received data storage unit, and a substitution instruction to substitute the original attribute information image of the source image of each page with the new attribute information image.

* * * * *